(12) United States Patent
Ba Le et al.

(10) Patent No.: US 6,673,273 B2
(45) Date of Patent: Jan. 6, 2004

(54) CROSSLINKED POLYMER ELECTROLYTE COMPOSITIONS

(75) Inventors: Dinh Ba Le, St. Paul, MN (US); Jerome Edward Scanlan, St. Paul, MN (US); Ravindra L. Arudi, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 34 days.

(21) Appl. No.: 10/037,413

(22) Filed: Oct. 24, 2001

(65) Prior Publication Data

US 2003/0094599 A1 May 22, 2003

(51) Int. Cl.$^7$ .................. H01M 6/18; H01B 1/12; C08K 3/00; C08L 75/00
(52) U.S. Cl. .................. 252/511; 252/500; 252/506; 252/518.1; 429/142; 429/303; 429/304; 429/309; 429/319; 523/500; 523/515
(58) Field of Search ................. 252/500, 506, 252/511, 518.1; 428/327; 264/211; 429/134, 142, 303, 304, 309, 319; 523/500, 515

(56) References Cited

U.S. PATENT DOCUMENTS

| | | | |
|---|---|---|---|
| 4,233,425 A | 11/1980 | Tefertiller et al. | 525/455 |
| 4,357,401 A | 11/1982 | Andre et al. | 429/192 |
| 4,451,627 A | 5/1984 | Frisch, Jr. et al. | 526/192 |
| 4,758,483 A | 7/1988 | Armand et al. | 429/192 |
| 4,830,939 A | 5/1989 | Lee et al. | 429/192 |
| 5,217,827 A | 6/1993 | Fauteux et al. | 429/192 |
| 5,529,707 A | 6/1996 | Kejha | 252/262 |
| 5,622,792 A | 4/1997 | Brochu et al. | 429/192 |
| 5,665,490 A | 9/1997 | Takeuchi et al. | 429/192 |
| 5,874,184 A | 2/1999 | Takeuchi et al. | 429/192 |
| 5,965,299 A | 10/1999 | Khan et al. | 429/313 |
| 6,096,456 A | 8/2000 | Takeuchi et al. | 429/249 |
| 6,156,458 A | * 12/2000 | Brodd et al. | 429/317 |
| 6,316,149 B1 | 11/2001 | Garbe et al. | 429/304 |
| 6,413,676 B1 | * 7/2002 | Munshi | 429/306 |

FOREIGN PATENT DOCUMENTS

| | | | | |
|---|---|---|---|---|
| JP | HEI 6-140052 | 8/1993 | | H01M/6/18 |
| JP | HEI 8-64028 | 8/1994 | | H01B/1/06 |
| JP | HEI 10-334731 | 12/1998 | | |
| JP | 10-334731 | * 12/1998 | | H01B/1/12 |
| JP | HEI 11-31415 | 2/1999 | | |
| JP | 11-031415 | * 2/1999 | | H01B/1/12 |
| WO | WO 01/17051 | 8/2001 | | H01M/10/40 |

\* cited by examiner

*Primary Examiner*—Yogendra N. Gupta
*Assistant Examiner*—Kallambella M Vijayakumar
(74) *Attorney, Agent, or Firm*—Mueting, Raasch & Gebhardt P.A.; Daniel R. Pastirik

(57) ABSTRACT

Electrolyte compositions for use in cells and batteries that include a crosslinked solid ionically conductive polymer having urethane groups, urea groups, thiocarbamate groups, or combinations thereof, particles, and a salt. Certain electrolyte compositions include a liquid thereby forming a gel electrolyte composition.

36 Claims, 2 Drawing Sheets

CROSSLINKED POLYMER ELECTROLYTE COMPOSITIONS

BACKGROUND

The present invention relates to electrolyte compositions and electrochemical cells for use in alkali metal polymer batteries, particularly lithium polymer batteries. Lithium polymer batteries typically include a lithium metal negative electrode (anode), or other suitable lithium-containing substance such as lithium metal alloys or lithium metal oxides, a metal oxide positive electrode (e.g., lithium vanadium oxide), and a solid polymer electrolyte. During operation, lithium is oxidized at the anode and lithium ions move into the electrolyte and to the cathode. When the battery is charged, lithium ions are reduced (plated) at the anode. This is accompanied by movement of lithium ions into the electrolyte from the cathode.

Solid electrolytes include ionically conducting polymers. The solid polymer electrolyte is typically poly(ethylene oxide) (PEO) based, complexed with a lithium salt. Such batteries possess high-energy storage capacity and rechargeability. PEO-based electrolytes are generally useful at temperatures above the melting point of the PEO-based salt complex. PEO itself has a melting point of 65° C. but this may be lowered by copolymerization and salt inclusion. The need to use PEO-based electrolytes at higher temperatures is primarily due to their high degree of crystallinity and the fact that lithium ion conduction takes place only through the amorphous region. This temperature dependence of the conductivity of PEO-based polymer electrolytes results in them being primarily used above ambient temperature. In lithium polymer batteries the temperature is often maintained and controlled at about 40° C. to about 80° C.

However, at temperatures above 65° C., uncrosslinked PEO undergoes flow and creep. This can result in the loss of mechanical strength, depriving the polymer electrolyte the ability to prevent cell shorting due to the formation of lithium dendrites. Also, PEO chains can migrate to the lithium anode surface and the free hydroxyl groups on the PEO can react with a lithium metal surface irreversibly. This can cause the interfacial resistance to increase and result in failures in battery cycling at 80° C. Thus, what is needed is an electrolyte that has the advantages of PEO, but fewer deficiencies.

SUMMARY

The present invention provides solid polymer electrolyte compositions. In one embodiment, the solid polymer electrolyte composition includes: a crosslinked solid ionically conductive polymer having urethane groups, urea groups, thiocarbamate groups, or combinations thereof; inorganic oxide particles; and a salt; with the proviso that at 20° C. there is less than about 1 wt-% liquid present in the electrolyte composition; and wherein the solid polymer electrolyte composition has an ionic conductivity of at least about $1 \times 10^{-4}$ S/cm at about 60° C. Preferably, and significantly, the inorganic oxide particles are substantially covalently bonded to either the polymer or other inorganic oxide particles (i.e., each other) through urethane groups, urea groups, thiocarbamate groups, or combinations thereof.

In another embodiment, the present invention provides a solid polymer electrolyte composition that includes: a crosslinked solid ionically conductive polymer having urethane groups, urea groups, thiocarbamate groups, or combinations thereof; nanoparticles, wherein at least 50% of the nanoparticles have a smallest dimension less than about 50 nm; and a salt; with the proviso that at 20° C. there is less than about 1 wt-% liquid present in the electrolyte composition; and wherein the solid polymer electrolyte composition has an ionic conductivity of at least about $1 \times 10^{-4}$ S/cm at 60° C.

In yet another embodiment, the present invention provides a solid polymer electrolyte composition that includes: a crosslinked solid ionically conductive polymer that includes a poly(alkylene oxide) polymer having urethane groups; at least about 0.5 wt-% hydroxyl-functional inorganic oxide particles; and a salt; with the proviso that at 20° C. there is less than about 1 wt-% liquid present in the electrolyte composition; and wherein the solid polymer electrolyte composition has an ionic conductivity of at least about $1 \times 10^{-4}$ S/cm at about 60° C.

In another embodiment, the present invention provides a solid polymer electrolyte composition that includes: a crosslinked solid ionically conductive polymer that includes a poly(alkylene oxide) polymer having urethane groups, wherein the solid ionically conductive polymer is prepared from a polyisocyanate, a poly(alkylene oxide) polymer having an equivalent weight of about 1,000 to about 100,000, and a poly(alkylene oxide) polymer having an equivalent weight of about 150,000 to about 500,000; at least about 3 wt-% hydroxy-functional inorganic oxide particles; and a lithium salt; with the proviso that at 20° C. there is less than about 1 wt-% liquid present in the electrolyte composition; and wherein the solid polymer electrolyte composition has an ionic conductivity of at least about $1 \times 10^{-4}$ S/cm at about 60° C.

In still another embodiment, the present invention provides a solid polymer electrolyte composition that includes: a crosslinked solid ionically conductive polymer prepared from a polymer of the formula A-(alkylene oxide)$_n$-A, wherein A is —OH, —NH$_2$, or —SH, and n is at least about 10, and a molar excess of a compound of the formula Z—R—T, wherein T is an organic group having a vinyl group, R is a divalent organic group, and Z is a functional group capable of reacting with —OH, —NH$_2$, or —SH; at least about 0.5 wt-% hydroxyl-functional inorganic oxide particles; and a lithium salt; with the proviso that at 20° C. there is less than about 1 wt-% liquid present in the electrolyte composition; and wherein the solid polymer electrolyte composition has an ionic conductivity of at least about $1 \times 10^{-4}$ S/cm at about 60° C.

The present invention also provides gel electrolyte compositions. In one embodiment, a gel electrolyte composition includes: a crosslinked solid ionically conductive polymer having urethane groups, urea groups, thiocarbamate groups, or combinations thereof; inorganic oxide particles; and a liquid electrolyte including a liquid at 20° C. and a salt; with the proviso that the gel electrolyte composition is nonswellable; and wherein the gel electrolyte composition has an ionic conductivity of at least about $1 \times 10^{-4}$ S/cm at about 20° C.

In another embodiment, a gel electrolyte composition includes: a crosslinked solid ionically conductive polymer having urethane groups, urea groups, thiocarbamate groups, or combinations thereof; nanoparticles, wherein at least 50% of the nanoparticles have a smallest dimension less than about 50 nm; and a liquid electrolyte including a liquid at 20° C. and a salt; with the proviso that the gel electrolyte composition is nonswellable; and wherein the gel electrolyte composition has an ionic conductivity of at least about $1 \times 10^{-4}$ S/cm at about 20° C.

In yet another embodiment, a gel electrolyte composition includes: a crosslinked solid ionically conductive polymer that includes a poly(alkylene oxide) polymer having urethane groups; at least about 0.5 wt-% hydroxyl-functional inorganic oxide particles; and a liquid electrolyte including a liquid at 20° C. and a salt; with the proviso that the gel electrolyte composition is nonswellable; and wherein the gel electrolyte composition has an ionic conductivity of at least about $1 \times 10^{-4}$ S/cm at about 20° C.

In another embodiment, a gel electrolyte composition includes: a crosslinked solid ionically conductive polymer that includes a poly(alkylene oxide) polymer having urethane groups, wherein the solid ionically conductive polymer is prepared from a poly(alkylene oxide) polymer having a weight average molecular weight of about 1,000 to about 20,000 and a polyisocyanate; hydroxyl-functional inorganic oxide particles; and a liquid electrolyte including a liquid at 20° C. and a salt; with the proviso that the gel electrolyte composition is nonswellable; and wherein the gel electrolyte composition has an ionic conductivity of at least about $1 \times 10^{-4}$ S/cm at about 20° C.

In still another embodiment, a gel electrolyte composition includes: a crosslinked solid lithium-ion conductive polymer that includes a poly(alkylene oxide) polymer having urethane groups, wherein the solid ionically conductive polymer is prepared from a poly(alkylene oxide) polymer having a weight average molecular weight of about 1,000 to about 20,000 and a polyisocyanate; at least about 0.5 wt-% alumina particles; and a liquid electrolyte including a liquid at 20° C. and a salt; with the proviso that the gel electrolyte composition is nonswellable; and wherein the gel electrolyte composition has an ionic conductivity of at least about $1 \times 10^{-4}$ S/cm at about 20° C.

Such electrolyte compositions can be used in half cells that include a cathode and a current collector or in electrochemical cells that include a first electrode and a second electrode. Such electrolytes are particularly useful in alkali polymer batteries.

The present invention also provides methods of making electrolytes. In one embodiment of a process for making a solid polymer electrolyte, the method includes: combining a poly(alkylene oxide) polyol, a salt, and inorganic oxide particles; adding a polyisocyanate and an optional catalyst; and thermally treating the mixture (e.g., extruding) to form a solid polymer. The mixture can optionally include a processing solvent that is removed during the thermal treating step.

In one embodiment of a process for making a gel electrolyte composition, the method includes: combining a poly(alkylene oxide) polyol, a salt, a liquid, and inorganic oxide particles; adding a polyisocyanate and an optional catalyst; and thermally treating the mixture (e.g., extruding) to form a gel; wherein a majority of the liquid electrolyte remains in the gel. The mixture can optionally include a processing solvent that is removed during the thermal treating step.

In yet another process for making an electrolyte composition, the method includes combining a polymer (which typically includes water) of the formula A-(alkylene oxide)$_n$-A, wherein A is —OH, —NH$_2$ or —SH, and n is at least about 10, with a molar excess of a compound of the formula Z—R—T, wherein T is an organic group having a vinyl group, R is a divalent organic group, and Z is a functional group capable of reacting with —OH, —NH$_2$, or —SH to form a polyunsaturated poly(alkylene oxide) having a molecular weight of at least about 100,000. The method typically includes crosslinking (e.g., with ultraviolet radiation) the polyunsaturated poly(alkylene oxide).

DETAILED DESCRIPTION OF PREFERRED EMBODIMENTS

Figure 1:
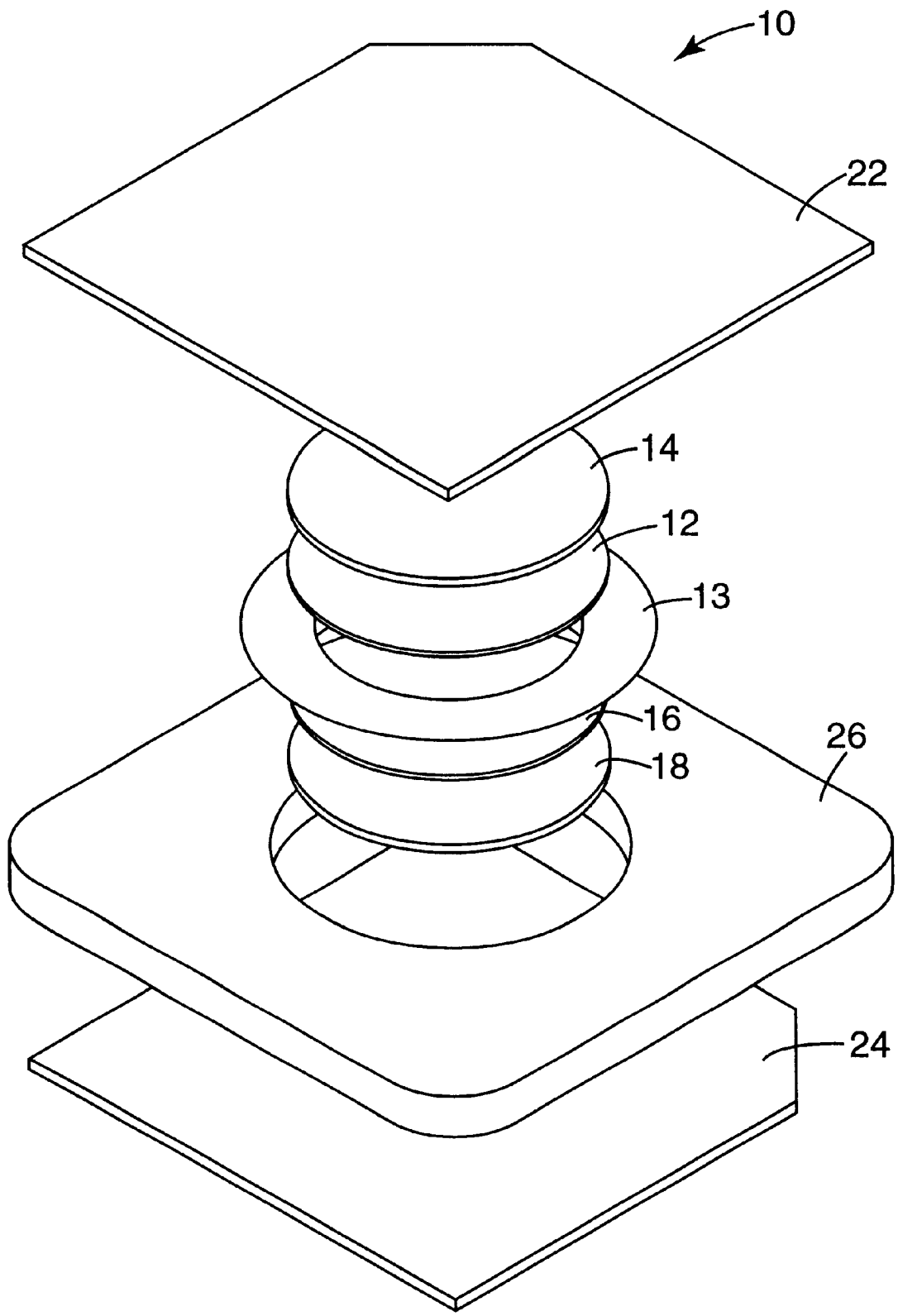
FIG. 1 is a schematic of an electrochemical cell.

The present invention provides electrolyte compositions, cells, and batteries that include a crosslinked solid polymer. In certain embodiments, a plasticizer (i.e., a liquid (at 20° C.) such as a nonaqueous organic solvent) is also present within the matrix of the crosslinked solid polymer such that a gel results. As used herein, a "solid polymer electrolyte composition" or simply a "solid polymer electrolyte" includes a crosslinked solid polymer and less than about 1 weight percent (wt-%) of a liquid (at 20° C.), and desirably, substantially no liquid. This can be measured by vacuum distillation and weight change. A "gel electrolyte composition" or simply a "gel electrolyte" includes a crosslinked solid polymer and a liquid (i.e., a plasticizer that is liquid at 20° C.). Both the solid and gel electrolyte compositions include particles (e.g., inorganic oxide particles, which can be nanoparticles) for mechanical strength, for example.

For certain embodiments, the crosslinked polymer used in either the solid polymer electrolyte compositions or gel electrolyte compositions of the present invention includes urethane (—HN—C(O)—O—), urea (—HN—C(O)—NH—), and/or thiocarbamate (—HN—C(O)—S—) groups (typically, urethane groups). The crosslinked polymer is capable of incorporating alkali metal salts and conducting ions (typically, alkali metal ions, and desirably, lithium ions). When the polymer is used in a solid electrolyte composition, the solid electrolyte composition is typically capable of conducting ions at a sufficient rate at greater than about 40° C., and often within a range of about 60° C. to about 80° C. Typically, a suitable polymer for a solid electrolyte composition is one that provides a solid polymer electrolyte composition with a conductivity of at least about $1 \times 10^{-4}$ Siemens per centimeter (S/cm) at about 60° C.

When the polymer is used in a gel electrolyte composition, the gel electrolyte composition is typically capable of conducting ions at a sufficient rate at greater than about 15° C., and often within a range of about 20° C. to about 30° C. Typically, a suitable polymer for a gel electrolyte composition is one that provides a gel electrolyte composition with a conductivity of at least about $1 \times 10^{-4}$ S/cm at about 20° C.

Thus, the solid polymer electrolyte compositions and the gel electrolyte compositions of the present invention typically have utilities in different temperature ranges. Generally, batteries that include solid polymer electrolyte compositions of the present invention are useful at elevated temperatures (e.g., about 60° C. to about 80° C.), whereas batteries that include gel electrolyte compositions of the present invention are useful at ambient temperatures (e.g., about 20° C. to about 30° C.).

In the gel electrolyte composition of this invention, the liquid (i.e., plasticizer) is generally completely entrapped in the crosslinked solid polymer network. That is, the gel is nonswellable. By this it is meant that the gel has a swell ratio of less than about 1.5 when immersed in at least one of acetonitrile, methyl ethyl ketone (MEK), or water (preferably, when immersed in any one of these solvents) at 20° C. Typically, this can be determined by placing x grams of the gel in 10×grams of one of the above-listed solvents for 1 hour, removing the gel, allowing it to dry, and reweighing the gel. This is described in greater detail in the Examples Section.

Such nonswellable gels are distinct from many conventional gel electrolytes that are formed by swelling the liquid into the solid polymer matrix. The liquid of such conventional gels is typically extractable. With the nonswellable gels of the present invention, there is less leaking or volatility of the liquid, and generally better elasticity or tensile strength of the films formed from the gels. Furthermore, the gel electrolyte can be cast as a thin film without a processing solvent (i.e., a "waste" fugitive solvent typically used in coating a film) such as toluene, acetonitrile, or ethyl acetate.

The electrolyte compositions (both solid and gel electrolyte compositions) of the present invention are typically capable of forming films of a thickness of about 10 micrometers (microns) to about 50 microns. Desirable films for use as electrolytes in alkali metal batteries typically are: smooth to the eye under a 50×microscope; self-standing (i.e., free-standing), which refers to a film that is capable of staying intact when cast without a substrate or when removed from the substrate; highly elastic; and glossy and substantially transparent. Desirable films also adhere to lithium metal and exhibit stability with a 3.6 Volt (V) cathode. This latter reference to stability can be defined as a capacity fade of no greater than about 20% after 10 full discharge/charge cycles at 60° C. Furthermore, desirable films demonstrate good battery cycling, e.g., at least 100 cycles with a stable voltage of less than 10 millivolts (mV) change over the 100 cycles using Cycling Procedure No. 1 described in the Examples Section.

Particularly desirable solid polymer electrolyte compositions of the present invention display the following characteristics: dimensional and mechanical stability such that a free-standing film can be formed; elasticity when in the form of a film of about 10 microns to about 50 microns such that the film displays a "strain at break" or "engineering strain" of at least 100%, calculated as ((stretched length−initial length)/initial length)×100%, for a film of 2.5 centimeters (cm)×5 cm×20 microns; a crystalline melting point (Tm) of less than about 60° C., or more desirably, no crystalline melting point (i.e., amorphous at room temperature (i.e., 25° C. to about 30° C.)); a crystallization temperature (Tc) of less than about 40° C.; a glass transition temperature (Tg) of about −30° C. to about −40° C.; a swell ratio of less than about 2, and typically about 1.6 to about 2; conductivity of at least about 0.1 mS/cm, and typically about 0.2 mS/cm to about 0.3 mS/cm, at 60° C. measured in a LiLi cell; interfacial resistance of about 10 ohms·cm$^2$ to about 100 ohms·cm$^2$; and LiLi cycling at 60° C. as represented by the graph in FIG. 1 using Cycling Procedure No. 1.

Particularly desirable gel electrolyte compositions of the present invention display the following characteristics: dimensional and mechanical stability such that a free-standing film can be formed; elasticity when in the form of a film of about 20 microns to about 50 microns such that the film displays a "strain at break" or "engineering strain" for a film of 2.5 cm×5 cm×20 microns of at least 100%; a swell ratio of less than about 1.5, and typically less than about 1.2; conductivity of at least about 0.1 mS/cm, and typically about 1 mS/cm to about 10 mS/cm, at 20° C. measured in a LiLi cell.

Suitable solid polymers are highly crosslinked with a nominal infinite molecular weight. That is, the crosslinked polymer used in either the solid or the gel electrolyte compositions of the present invention has a swell ratio as low as possible (e.g., about 1.0 is a desirable target). Prior to crosslinking, the polymers typically have a weight average molecular weight of at least about 400, more often, at least about 1,000, even more often, at least about 2,000, even more often at least about 3,000, and desirably at least about 10,000. Prior to crosslinking, the polymers typically have a weight average molecular weight of no greater than about 1,000,000, more often no greater than about 600,000, even more often no greater than about 400,000, and desirably no greater than about 200,000.

Generally, lower molecular weight polymers (typically, about 1,000 to about 20,000) are used in the gel electrolytes and higher molecular weight polymers (typically, about 3,000 to about 1,000,000) are used in the solid electrolytes for desirable electrolyte properties (e.g., swell ratio and elasticity). The lower molecular weight polymers are often in the form of liquids. The use of liquid polymer starting materials (i.e., precursors) advantageously can eliminate the use of processing solvents and can enable direct coating on substrates such as metal foils. The electrolyte composition can also include relatively small amounts of polymers having higher (e.g., up to about 8,000,000) or lower (e.g., less than about 1,000) molecular weights.

Examples of crosslinked solid ionically (e.g., lithium-ion) conductive polymers include poly(alkylene oxide) or poly (alkylene imine) polymers. More frequently, they are poly (alkylene oxide) polymers. Typically, the crosslinked solid polymers include urethane groups, urea groups, thiocarbamate groups, or combinations thereof, which may be in the backbone of the polymer chains, in side chains thereof, or in the crosslinks between polymer chains. For certain embodiments, the crosslinks include one or more urethane groups, urea groups, thiocarbamate groups, or combinations thereof. For certain other embodiments, the backbones of the polymer chains include one or more of these groups.

Exemplary poly(alkylene oxide) (e.g., poly(ethylene oxide)) or poly(alkylene imine) (e.g., poly(ethylene imine)) polymers can be random or block. They are typically blocks of poly(oxyethylene), poly(oxypropylene), or poly (oxyethylene)/poly(oxypropylene), and more typically, poly (oxyethylene)-containing polymers.

For certain embodiments, such as those exemplified in Examples 1–19 and 27 in the Examples Section, a desirable group of precursor polymers (i.e., polymeric materials prior to crosslinking) have a weight average molecular weight of about 2,000 to about 300,000, and typically, about 2,000 to about 200,000. These lower molecular weight polymers are desirably poly(alkylene oxides).

If such precursor polymers do not form smooth films, higher molecular weight precursor polymers can be used in combination with these lower molecular weight polymers, as demonstrated in Examples 1–13, 18, and 19 in the Examples Section. These higher molecular weight polymers are important in improving coating, viscosity control, "green" strength (i.e., uncured film strength), cured film strength, film handling ability, and prevention of coating defects and typically represent the minor polymer component in a mixture with a lower molecular weight polymer. The lower molecular weight polymers typically represent the major polymer component when used in combination with a higher molecular weight film-forming precursor polymer for certain embodiments with a relatively high concentration of particles (e.g., at least about 3 wt-%), as demonstrated in Examples 1–13, 18, and 19 in the Examples Section. Desirable higher molecular weight precursor polymers are also poly(alkylene oxides) (i.e., oxyalkylene polymers). They typically have a weight average molecular weight of at least about 200,000, more often at least about 300,000, and desirably, at least about 600,000.

For certain other embodiments, such as those exemplified in Examples 30–38 in the Examples Section, a desirable group of precursor polymers (i.e., materials prior to crosslinking) have a weight average molecular weight of at least about 100,000, and typically, at least about 200,000. They typically have a weight average molecular weight of no greater than about 600,000, to allow for coatability. The electrolyte composition can also include relatively small amounts of precursor polymers, particularly poly(alkylene oxide) polymers, having higher (e.g., about 600,000 to about $8 \times 10^6$) or lower (e.g., less than about 100,000) molecular weights. Such higher molecular weight polymers are typically used alone, or in a major amount, in certain embodiments that include a relatively low concentration of particles (e.g., no more than about 3 wt-%). Furthermore, such embodiments typically have a lower crosslink density than embodiments that have a mixture of high and low molecular weight polymers as discussed above. They are also desirably poly(alkylene oxides).

The urethane-, urea-, and/or thiocarbamate-containing polymers may be formed by reacting polymers containing —OH, —NH$_2$, or —SH functionality with polyisocyanates as exemplified herein. Alternatively, (meth)acrylate-functional polymers containing urethane, urea, and/or thiocarbamate groups can be radiation (e.g., UV) cured to crosslink the (meth)acrylate groups. Other crosslinking mechanisms can be used that result in a composition having the required urethane, urea, and/or thiocarbamate functional groups. For example, U.S. Pat. No. 5,665,490 (Takeuchi et al., Example 1) discloses the synthesis of compounds containing poly(oxyethylene) and internal urethane linkages with terminal alkene functionality. These materials could thus crosslink via the double bond by means such as UV curing. Conceivably one could also use a similar material with epoxide terminal functionality.

In certain embodiments, the crosslinked polymer is derived from a poly(alkylene oxide) having hydroxyl, amine, and/or thiol functionality, typically a polymer of the formula A-(alkylene oxide)$_n$-A, wherein A is —OH, —NH$_2$, or —SH, and n is at least about 10 (desirably, n is no greater than about 13,500, more desirably, n is about 50 to about 500, and most desirably, n is about 2,000 to about 3,000). Typically, A is an —OH group. The alkylene oxide can be methylene oxide, ethylene oxide, propylene oxide, butylene oxide, etc., or combinations thereof. Thus, the polymer can be a homopolymer or a copolymer. As used herein, a "copolymer" refers to polymers containing two or more different types of monomers (e.g., terpolymers and tetrapolymers, etc.). Preferably, the polymer A-(alkylene oxide)$_n$-A is a poly(ethylene oxide) homopolymer or copolymer (i.e., a poly(oxyethylene)-containing polymer). That is, at least a portion of the alkylene oxide units are ethylene oxide.

The crosslinked polymers can be formed by reacting the A-(alkylene oxide)$_n$-A polymer with a polyisocyanate (i.e., a multifunctional isocyanate) or with a compound of the formula Z—R—T wherein Z includes functional groups capable of reacting with —OH, —NH$_2$, or —SH. For certain embodiments, the compound is of the formula Z—R—T wherein Z is —NCO, —SO$_2$Cl, —COOH, —C(O)Cl, —SO$_3$H, or —H$_2$PO$_4$, R is a divalent organic group (e.g., C1–C3 alkylene group), and T is an organic group including a vinyl group (e.g., an acrylate, methacrylate, acrylamide, methacrylamide, or vinyl ether). Desirably, T is —C(O)—CY=CH$_2$ wherein Y is H or CH$_3$. In certain embodiments, the compound is of the formula Z—R—C(O)—T and is an isocyanatoalkyl(meth)acrylate.

Typically, when a polyisocyanate is the reactant, the urethane, urea, and/or thiocarbamate groups are in the crosslinks, whereas when the compound Z—R—T is the reactant, the urethane, urea, and/or thiocarbamate groups are in the backbone of the polymer and the crosslinks are formed by subsequent reaction of the T groups. The polyisocyanates are typically triisocyanates, although diisocyanates can be used with polyols, polyamines, and/or polythiols having a functionality of at least three.

For embodiments that include precursor polymers that have a weight average molecular weight of about 2,000 to about 300,000, and typically, to about 200,000, higher molecular weight, film-forming precursor polymers, typically, poly(alkylene oxides), which may or may not have hydroxyl, amine, and/or thiol functionality, are used in combination.

Suitable poly(alkylene oxide) precursor polymers are prepared from methylene oxide, ethylene oxide, propylene oxide, butylene oxide, glycidyl ethers, and the like, and their corresponding glycols. They can be random, sequential, or block polymers. Desirably, the polymers contain two or more primary or secondary aliphatic functional groups (i.e., the hydroxyl, amine, and/or thiol group is bonded directly to a nonaromatic carbon atom). The functional group may be terminally situated, or may be pendent from a homopolymer or copolymer. Combinations of various polymers can be used if desired.

Particularly useful low molecular weight poly(alkylene oxide) polymers have a weight average molecular weight of at least about 2,000. Particularly useful low molecular weight poly(alkylene oxide) polymers have a weight average molecular weight of no greater than about 300,000, and often no greater than about 200,000.

Alternatively stated, because the low molecular weight poly(alkylene oxide) polymers include functionality (e.g., hydroxyl, amine, and/or thiol groups), particularly useful such polymers have an equivalent weight (e.g., hydroxyl equivalent weight) of at least about 1,000. Particularly useful low molecular weight poly(alkylene oxide) polymers have an equivalent weight of no greater than about 150,000, and often no greater than about 100,000.

As discussed above, for certain preferred embodiments that include the lower molecular weight polymer such as a poly(alkylene oxide) and often a higher concentration of particles (e.g., at least about 3 wt-%), a precursor polymer, typically a poly(alkylene oxide) polymer, having a higher molecular weight is included within the electrolyte composition. This polymer contributes to the formation of a smooth thin film because of the higher molecular weight.

Particularly useful high molecular weight poly(alkylene oxide) polymers have a weight average molecular weight of at least about 200,000, often, at least about 300,000, and desirably, at least about 600,000. Particularly useful high molecular weight poly(alkylene oxide) polymers have a weight average molecular weight of no greater than about 1,000,000.

If the high molecular weight poly(alkylene oxide) precursor polymers include functionality (e.g., hydroxyl, amine, and/or thiol groups), particularly useful such polymers preferably have an equivalent weight (e.g., hydroxyl equivalent weight) of at least about 100,000, often, at least about 150,000, and desirably, at least about 300,000. Particularly useful high molecular weight poly(alkylene oxide) precursor polymers preferably have an equivalent weight of no greater than about 500,000.

For certain preferred embodiments of solid polymer electrolyte compositions, the solid polymer is prepared from the reaction product of a polyisocyanate, a poly(alkylene oxide) polymer having an equivalent weight of about 1,000 to about 100,000 and a poly(alkylene oxide) polymer having an equivalent weight of about 150,000 to about 500,000. Typically, both the high equivalent weight polymer and the low equivalent weight polymer include functionality selected from hydroxyl, amine, thiol, or combinations thereof. Desirably, both have hydroxyl functionality.

For certain preferred embodiments of gel electrolyte compositions, the solid polymer is prepared from the reaction product of a polyisocyanate and a liquid poly(alkylene oxide) polymer. Typically, such liquid poly(alkylene oxide) precursor polymers have a weight average molecular weight of about 1,000 to about 20,000.

Whether a high molecular weight component or low molecular weight component, classes of precursor polymers that are particularly desirable include poly(oxypropylene) diols, triols and tetrols, and poly(oxyethylene) diols, triols, and tetrols, and random and block polymers of these polyether polyols in which the polyol is made with ethylene, propylene, butylene oxides and/or glycidyl ethers.

Examples of useful hydroxyl functional poly(alkylene oxide) polymers include, but are not limited to, those commercially available under the trade designations TETRONIC (tetrafunctional block copolymers derived from sequential addition of propylene oxide and ethylene oxide to ethylene diamine with hydrophilic endblocks) and TETRONIC R (tetrafunctional block copolymers derived from sequential addition of propylene oxide and ethylene oxide to ethylene diamine with hydrophobic endblocks) copolymers, both of which are available from BASF, Mt. Olive, N.J.; and PLURONIC (triblock copolymers with polyethylene oxide end blocks and polypropylene oxide midblock) and PLURONIC R (triblock copolymers with polypropylene oxide endblocks and polyethylene oxide midblocks) copolymers available from BASF; and UCON Fluids (random copolymers of ethylene oxide and propylene oxide) available from Union Carbide, Danbury, Conn.

An example of a useful poly(ethylene imine) is that available under the trade designation POLYMIN P (BASF, Charlotte, N.C.). Poly(ethylene imines) of molecular weight 600–100,000 are also available from Polysciences, Warrington, Pa.

Examples of useful amine functional poly(alkylene oxide) polymers include, but are not limited to, those commercially available under the trade designation JEFFAMINE poly(alkylene oxide) copolymers available from Huntsman Chemical Corp., Houston, Tex.

Examples of useful thiol functional poly(alkylene oxide) polymers include, but are not limited to, those that can be prepared by one of at least three routes: (1) conversion of a polyol to a polyhalide followed by reaction of this with hydrogen sulfide; (2) reaction of a polyol with thiourea followed by alkaline hydrolysis (see, for example, *Introduction to Organic Chemistry*, Streitwieser & Heathcock, MacMillan Publishing Co., NY, N.Y., 242–243 (1976); or (3) reaction of a polyol with $P_2S_5$ (see British patent 917,921 assigned to Albright and Wilson).

Examples of other useful (and preferred) polymers are the following poly(alkylene oxide) polyols available under the trade designations CARBOWAX 8000 (polyethylene glycol, molecular weight 8000, solid diol) and CARBOWAX SENTRY (polyethylene glycol, molecular weight 400, diol) from Union Carbide, Danbury, Conn.; PLURONIC L64 (ethylene oxide-propylene oxide-ethylene oxide block copolymer, 2900 molecular weight, liquid diol) from BASF, Gurnee, Ill.; PLURONIC F68 (ethylene oxide-propylene oxide-ethylene oxide block copolymer, 8400 molecular weight, solid diol) from BASF, Gurnee, Ill.; (poly(ethylene glycol-ran-propylene glycol), hydoxyl terminal) from Aldrich, Milwaukee, Wis.; POLYLOX WSR-80 (a polyethylene oxide, 200,000 molecular weight, solid diol) and POLYOX WSRN-10 (a polyethylene oxide, 100,000 molecular weight) from Union Carbide, Danbury, Conn.; UCON 75-H-90,000 (a random ethylene oxide propylene oxide copolymer) from Union Carbide, Danbury, Conn.; and POLYLOX WSR-205 (a polyethylene oxide, 600,000 molecular weight, solid diol) from Union Carbide, Danbury, Conn. The latter polymer is an example of a film-forming high molecular weight polymer.

Examples of polyisocyanates include, but are not limited to, ethylene diisocyanate, 1,4-tetramethylene diisocyanate, 1,6-hexamethylene diisocyanate, trimethyl hexamethylene diisocyanate, 1,12-dodecane diisocyanate, cyclobutane-1,3-diisocyanate, cyclohexane-1,3- and -1,4-diisocyanate, 1-isocyanato-3,3,5-trimethyl-5-isocyanatomethylcyclohexane(isophorone diisocyanate, IDPI), 2,4-and 2,6-hexahydrotolylene diisocyanate, perhydo-2,4'- and -4,4'-diphenylmethane diisocyanate (MDI), hexahydro-1,3- and -1,4-phenylene diisocyanate, 1,3- and -1,4-phenylene diisocyanate, 2,4- and 2,6-tolylene diisocyanate, diphenylmethane-2,4'- and -4,4'-diisocyanate, mixtures of 2,2,4- and 2,4,4-trimethyl hexamethylene diisocyanate (TMDI), naphthylene-1,5-diisocyanate, 3,5,5-trimethyl-1-isocyanato-3-isocyanatomethyl-3-cyclohexane, 4,4',4"-triisocyanatotriphenylmethane, triphenylmethane-4,4',4"-triisocyanate, polyphenyl polymethylene polyisocyanates, m- and p-isocyanatophenyl sulfonyl isocyanates, perchlorinated aryl polyisocyanates, polyisocyanates containing carbodimide groups, norbornane diisocyanates, polyisocyanates containing allophanate groups, polyisocyanates containing isocyanurate groups, polyisocyanates containing urethane groups, polyisocyanates containing acrylated urea groups, polyisocyanates containing biuret groups, polyisocyanates produced by telomerization reactions, polyisocyanates containing ester groups, as well as polyisocyanates described in U.S. Pat. No. 3,700,643 (Smith et al., col. 4, lines 41–64) and U.S. Pat. No. 3,600,359 (Miranda et al., col. 3, line 53-col. 4, line 12). A desirable polyisocyanates are aliphatic because aromatic polyisocyanates tend to be unstable. A particularly desirable polyisocyanate is a triisocyanate commercially available under the trade designation DESMODUR N3200 from Bayer Chemicals, Philadelphia, Pa. Combinations of polyisocyanates can be used if desired.

Examples of compounds of the formula Z—R—T include, but are not limited to, isocyanato ethyl methacrylate (IEM), allyl isocyanate, and meta-TMI having the structure:

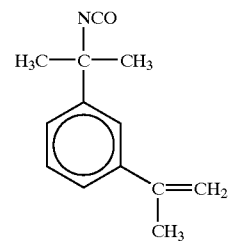

For certain embodiments, a typical mixing ratio of the polyol (polyamine or polythiol) and polyisocyanate components in the electrolyte formulations of this invention will provide an isocyanate index ("NCO index") value of about 70 to about 120. The NCO index is calculated as the ratio of the NCO equivalents present divided by the hydroxy/amine/thiol equivalents (from the polyols/polyamines/polythiols and particles, which are described in greater detail below, if they include functionality such as hydroxyl groups) present in the formulation, with the resulting quotient multiplied by 100.

If a high molecular weight film-forming precursor polymer is used in the compositions, an amount is present that provides a smooth film. This can be readily determined by one of skill in the art. Typically, it includes at least about two times the amount of lower molecular weight precursor polymer, and often as much as 20 times the amount of lower molecular weight polymer.

The compound of formula Z—R—T is typically used in a molar excess relative to the amount of polymer of formula A-(alkylene oxide)$_n$-A. In increasing order of desirability, it is used in at least about a 10×, 25×, 40×, or 60×molar excess. This is advantageous because such commercially available polymers also include water, which can be expensive and tedious to remove. The excess Z—R—T reacts with the water to form a by-product that is not deleterious to the electrolyte composition. In fact, in some embodiments, the by-product appears to enhance the performance of the electrolyte composition. Typically, the by-product is a polyunsaturated urea.

Although a catalyst is not required, the polymer is preferably formed using a conventional catalyst for forming urethane-containing polymers from polyols and polyisocyates, urea-containing polymers from polyamines and polyisocyanates, or carbamate-containing polymers from polythiols and polyisocyanates. These include amine and/or tin compounds. Examples include, but are not limited to, triethylamine, N,N-dimethyl cyclohexylamine, N,N,N', N'-tetramethyl ethylenediamine, triethylene diamine, 1,2-dimethyl imidazole, triethanolamine, stannous octoate, dibutyltin acetate, dibutyltin dilaurate, dibutyltin mercaptide, dibutyltin thiocarboxylate, dioxtyltin mercaptide, 1-((dimethylamino)ethyl)-4-methyl-methylpiperazine 1,1,3,5,5 pentamethyl-diethylenetriamine, and combinations thereof. Typically, one or more catalysts are used in an amount of at least about 0.005 wt-%, and desirably, no more than about 0.2 wt-%, based on final reacted total solids of the electrolyte composition (e.g., polyol, polyisocyanate, Li salt, particles, and other additives).

For certain embodiments of the present invention, the polymer can be combined with a liquid to form a gel that is typically nonswellable. Such liquids are often referred to as plasticizers and enhance the conductivity of the solid polymer at lower temperatures. They demonstrate good solubility for the salt such that the salt/liquid electrolyte (solution) is preferably highly conducting at the use temperature. The liquid in the liquid electrolyte typically also has a low vapor pressure, low freezing point, and low flammability. Such liquids include nonaqueous organic solvents such as propylene carbonate, ethylene carbonate, dimethyl carbonate, diethyl carbonate, butylene carbonate, gama-butyrolactone, tetrahydrofuran, 2-tetrahydrofuran, 1,3-dioxolane, 4,4-dimethyl-1,3-dioxolane, sulfolane, 3-methyl sulfolane, dimethyl ether, diethyl ether, tert-butyl ether, iso-butyl ether, 1,2-dimethoxy ethane, 1,2-ethoxymethoxy ethane, methyl diglyme, methyl tetraglyme, ethyl glyme, ethyl diglyme, polyethyleneglycol dimethylether (PEGDME), and polyethyleneglycol monomethylether (PEGMME). A preferred liquid is polyethyleneglycol dimethylether of molecular weight 275, available from Grant Chemical, Zachary, La.

Typically, the liquid in the liquid electrolyte is present in an amount of no greater than about 90 weight percent (wt-%), more typically, no greater than about 70 wt-%, and often, no greater than about 50 wt-%, based on the total weight of the entire electrolyte composition. Typically, the liquid in the liquid electrolyte is present in an amount of at least about 10 weight percent (wt-%), more typically, at least about 30 wt-%, and often, at least about 40 wt-%, based on the total weight of the entire electrolyte composition.

The electrolyte compositions of the present invention may also include one or more types of particles (inorganic or organic), typically inorganic oxide particles. The particles, which are typically in the form of nanoparticles, provide mechanical strength and a stable lithium-electrolyte interface.

As used herein, "nanoparticles" are defined as particles (primary and/or agglomerates) having an average size and shape such that at least one dimension (typically, the smallest dimension based on a number-weighted average using normal distribution statistics) is typically less than about 500 nm, and desirably less than about 50 nm. The smallest size dimension in such particle is defined and measured as the diameter of the largest circle that can be inscribed within the particle. For a spherical particle, this would be the particle diameter. The largest size dimension in such particle is defined and measured as the diameter of the smallest circle that can be circumscribed around the particle. For a spherical particle, this would also be the particle diameter. This number-weighted particle size range in electrolytes may be determined using a normal distribution statistical approach, as outlined in any number of statistical texts, e.g., *Data Reduction and Error Analysis for the Physical Sciences* by Philip R. Bevington, McGraw-Hill Book Company, New York (1969).

Typically, the particles (desirably, nanoparticles) are inorganic oxide particles. Examples of suitable inorganic oxide particles include, but are not limited to, oxides of silicon, aluminum, titanium, zirconium, magnesium, calcium, barium, strontium, and combinations thereof. Particularly desirable inorganic oxide particles include oxides of silicon (e.g., silica), aluminum (e.g., alumina), titanium (e.g., titania), zirconium (e.g., zirconia), and combinations thereof. In their synthesized state, these materials are commonly hydrophilic, due to the presence of surface hydroxyl groups.

Such hydroxyl-functional particles are particularly desired because they provide an interaction with the polymer (e.g., crosslinking with the polyisocyanates). This interaction is significant because the hydroxyl-functional particles are polyfunctional and can be used for crosslinking even in diol-diisocyanate systems not normally associated with crosslinking. The particle surfaces can be modified to have functionality in addition to or in place of hydroxyl groups such as amine, mercaptan, alkyl, acrylate, etc., as disclosed in U.S. Pat. No. 5,965,299 (Khan et al., Examples 3, 4, 6, and 7); Degussa trade literature (subsidiary Sivento "Product Range" catalog) and *Chemistry of silica; solubility, polymerization, colloid and surface properties, and biochemistry*, Ralph Iler, New York, Wiley, 1979.

Aluminum oxide (particularly, fumed alumina) is a particularly desirable material due to its stability in a dispersion with the polymer/salt as well as with or without processing solvent(s). It also is desirably hydroxyl-functional and will crosslink with an polyisocyanate, for example, as discussed above.

Typically, the total amount of particles is at least about 0.5 wt-%, often, at least about 3 wt-%, and desirably, at least about 10 wt-%, based on the total weight of the electrolyte composition. Typically, the total amount of particles is no more than about 30 wt-%, and desirably, no more than about 20 wt-%, based on the total weight of the electrolyte composition.

Commercially available high molecular weight polyethylene oxides (e.g., having a molecular weight of at least about 100,000) are well known to contain small amounts (typically, less than 3 wt-%) of fumed silica as a flow or processing aid (e.g., those available from Union Carbide).

The electrolyte compositions of the present invention also include one or more types of salts. The salt is a dissociable salt used in an amount to enhance (and generally maximize) the ionic conductivity of the electrolyte composition.

Suitable salts (often referred to as electrolyte salts) are those typically used in alkali polymer batteries, such as lithium polymer batteries. Examples include, but are not limited to, lithium imide salts such as lithium bis(trifluorosulfon)imide salt and lithium bis(perfluoroethanesulfon)imide, both of which are commercially available from 3M Co., St. Paul, Minn., lithium triflate, lithium tetrafluoroborate, lithium perchlorate, lithium iodide, lithium trifluorocarbonate, lithium nitrate, lithium thiocyanate, lithium hexafluoroarsenate, lithium hexafluorophosphate, lithium methide, lithium bromide, lithium fluoride, and mixtures of these materials.

Typically, the total amount of salt(s) is at least about 0.2 molar and desirably, at least about 0.5 molar, based on the total volume of the electrolyte composition. Typically, the total amount of salt(s) is no more than about 2.0 molar, and desirably, no more than about 1.5 molar, based on the total volume of the electrolyte composition.

The electrolyte composition can also include a variety of other components including such additives as antioxidants, surfactants, and lithium passivating agents such as iodine. Antioxidants and lithium passivating agents are desirable in either the solid polymer electrolyte compositions of the gel electrolyte compositions. Surfactants are particularly desirable in the gel electrolyte compositions to aid in forming continuous films on substrates such as propylene sheets or metal foils.

Examples of suitable antioxidants include those commercially available under the trade designations IRGANOX HP 2215 from Ciba, Tarrytown, N.Y., SANTOWHITE BBMC from Flexsys, Nitro, W. Va., and HOSTANOX 03 from Hoechst Celanese, Charlotte, N.C. Other antioxidants include butylhydroxy toluene and tetramethylthiuramdisulfide commercially available under the trade designation PBX-1, both of which are available from Aldrich Chemical Co., Milwaukee, Wis. A particularly desirable antioxidant is 4,4'-thiobis(6-tert-butyl-m-cresol) commercially available under the trade designation SANTONOX R from Monsanto, St. Louis, Mo. If used, an antioxidant is used in an amount of about 0.1 wt-% to about 1.0 wt-%, based on the total weight of the electrolyte composition.

Examples of suitable surfactants include nonionic surfactants such as nonylphenol alkoxylates or alcohol alkoxylates. A particularly desirable surfactant is a fluorosurfactant commercially available under the trade designation ZONYL FSN, DuPont, Wilmington, Del. If used, a surfactant is used in an amount of about 0.1 wt-% to about 1.0 wt-%, based on the total weight of the electrolyte composition.

The electrolyte composition can be prepared by a number of methods. These typically include solvent-based coating or reactive extrusion, the latter being particularly desirable. Mixing of the ingredients can be carried out with a Silverson rotor-slator type homogenizer, as described in the examples, or with other types of milling capable of particle size reduction including ball milling, jet milling, sand milling, attritor milling.

In an example of one embodiment, solvent coating involves, for example, mixing one reactant, such as a polyol, with a salt, and particles (e.g., nanoparticles) in a solvent mixture (e.g., acetonitrile/toluene); adding a polyisocyanate (or compound of the formula Z—R—T) less than 24 hours prior to coating; adding a catalyst less than 1 hour prior to coating; and finally coating, drying, and thermally curing.

In an example of another embodiment, reactive extrusion involves, for example, mixing and melting one reactant, such as a polyol, a salt, and particles; adding a polyisocyanate (or compound of the formula Z—R—T) less than 24 hours prior to extruding; adding a catalyst less than 1 hour prior to extruding; and finally extruding with thermal cure in a die.

In an example of another embodiment, a polymer of the formula A-(alkylene oxide)$_n$-A, as described above, with a molar excess of a compound of the formula Z—R—T, as described above, are combined to form a polyunsaturated poly(alkylene oxide) polymer. Preferably, the poly(alkylene oxide) is further crosslinked, for example, by reacting the polyunsaturated groups of the polymer using ionizing radiation, such as e-beam or ultraviolet (UV) radiation, and a photoinitiator, such as that commercially available under the trade designation ESACURE KT046 from Sartomer, Exton, Pa.

The electrolyte compositions of the present invention can be used in a variety of cells and batteries, preferred are alkali polymer batteries, particularly lithium polymer batteries. Such batteries generically include one or more cells of two electrodes (a first and a second electrode, i.e., cathode and anode) and an electrolyte therebetween. The cells typically also include a current collector.

A typical cell 10 for a lithium polymer battery is shown in FIG. 1. The electrolyte composition 12 is disposed on a sheet 13, such as a polypropylene sheet, and in contact with an anode 14, preferably a thin sheet or layer of lithium. The sheet 13 is shown in FIG. 1 as a hollow mask, which is preferred for a lithium-lithium cell to prevent shorting. A second layer 16 of the electrolyte composition is disposed on the opposite side of the sheet 13 and in contact with a cathode 18, which can be a thin sheet or layer of lithium. This forms a lithium-lithium battery. Alternatively, cathode 18 can be an oxide such as a lithium vanadium oxide, and the electrolyte layer 16 can be a current collector, such as a carbon-coated aluminum foil. Two shims 22 and 24, e.g., brass or copper shims, are shown in FIG. 1 for sealing the cell therebetween using an adhesive layer 26, such as a hot melt adhesive commercially available under the trade designation Thermal Bond Film TBF406 from 3M Co., St. Paul, Minn.

EXAMPLES

Objects and advantages of this invention are further illustrated by the following examples, but the particular materials and amounts thereof recited in these examples, as well as other conditions and details, should not be construed to unduly limit this invention.

| Material | Additional Characterization | Source/Trade Name |
|---|---|---|
| Acetonitrile | Anhydrous, used as purchased | Aldrich Chemical, Milwaukee, WI |
| Alumina | Aluminum oxide, 13-nm particle size, 2.5 OH/nm$^2$, 100 m$^2$/g | Aluminum oxide C, Degussa, Frankfurt, Germany |
| Antioxidant | 4,4'-Thiobis(6-tert-butyl-m-cresol) | SANTONOX R, Monsanto, St. Louis, MO |
| BHT | Butylhydroxy toluene | Aldrich Chemical Co., Milwaukee, WI |
| Dibutyltin dilaurate | Catalyst | Aldrich Chemical Co., Milwaukee, WI |
| Liquid EO-PO-EO | Ethylene oxide-propylene oxide-ethylene oxide block copolymer diol, 2900 molecular weight | PLURONIC L64, BASF, Gurnee, IL |
| Ethyl acetate | Anhydrous, used as purchased | Aldrich Chemical, Milwaukee, WI |
| JEFFAMINE D-2000 | Polyoxypropylenediamine (NH$_2$-equivalent weight 1018) | Huntsman, Houston, TX |
| Hirano | Knife edge coater | Hirano Multi-Coater M-200, Hirano Tecseed Co., Ltd., 101-1 Kawai, Kawai-cho, Kitakatsuragi-gun, Nara 636, Japan |
| Hydrophobic silica 7-nm | 7 nm, methyl capped, 160 m$^2$/g | R8200, Degussa, Frankfurt, Germany |
| Hydrophobic silica 15-nm | 15 nm, methyl capped, 110 m$^2$/g | R972, Degussa, Frankfurt, Germany |
| IEM | isocyanatoethyl methacrylate | Showa Denko, Japan |
| Ketjen Black | Carbon black powder | Akzo Nobel Chemicals, Chicago, IL, USA |
| KT046 | Photoinitiatior; blend of acylphosphinic oxide, trimethylbenzylphenone, and a polymeric hydroxyacetophenone | ESACURE KT046, Sartomer, Exton, PA |
| LiTFSI | Lithium bis(triflurosulfon)imide salt | 3M Co., St. Paul, MN |
| Li$_{1.2}$V$_3$O$_8$ | Not commercially available; made as per U.S. Pat. No. 6,136,476, Ex. 1 | 3M Co., St. Paul, MN |
| MEK | methylethylketone | Aldrich Chemical Co., Milwaukee, WI |
| PBX-1 | tetramethylthiuramdisulfide | Aldrich Chemical Co., Milwaukee, WI |
| PEGDME | Polyethyleneglycol dimethylether | Grant Chemical, Zachary, LA |
| PEG400 | Polyethylene glycol, 400 molecular weight | CARBOWAX SENTRY Polyethylenglycol 400 NF, Union Carbide, Danbury, CT |
| PEG8K | Polyethylene glycol, 8000 molecular weight | CARBOWAX 8000, Union Carbide, Danbury, CT |
| PEO100K | Polyethylene oxide, 100,000 molecular weight | POLYOX WSRN-10, Union Carbide, Danbury, CT |
| PEO200K | Polyethylene oxide, 200,000 molecular weight | POLYOX WSR-80 Union Carbide, Danbury, CT |
| PEO400K | Polyethylene oxide, 400,000 molecular weight | Aldrich, Milwaukee, WI |
| PEO600K | Polyethylene oxide, 600,000 molecular weight | POLYOX WSR-205, Union Carbide, Danbury, CT |
| Random EO-PO | Random copolymer of ethylene oxide and propylene oxide, hydroxy terminated, 12,000 molecular weight | Poly(ethylene glycol-ran-propylene glycol), Aldrich, Milwaukee, WI |
| Solid EO-PO-EO | Ethylene oxide-propylene oxide-ethylene oxide block copolymer, molecular weight 8400 | PLURONIC F68, BASF, Gurnlee, IL |
| Surfactant | Nonionic fluorosurfactant | FLUORAD FC-430, 3M Co., St.Paul, MN no longer commercially available, but ZONYL FSN, DuPont, Wilmington, DE is an equivalent |
| Tertiary amine | Catalyst 1-((Dimethylamino)ethyl)-4-methyl-Methylpiperazine 1,1,3,5,5 Pentamethyl-diethylenetriamine | DESMORAPID pp, Bayer, Pittsburg, PA |
| Toluene | Anhydrous toluene used as purchased | Aldrich Chemical Co., Milwaukee, WI |
| Triisocyanate | 1,6-hexamethylene-diisocyanate based polyisocyanate | DESMODUR N3200, Bayer, Pittsburgh, PA |
| Rexam Current Collector | Carbon coated Al foil, Rexam Series 83442 | Rexam Imaging Products, South Hadley, MA |

Example 1

Solid Polymer Electrolyte Composition

Alumina powder was dried at 110° C. under vacuum for 24 hours. PEG8K and PEO600K were dried at 50° C. under vacuum for 48 hours. A solution of 75 grams (g) PEG8K, 24.47 g LiTFSI, 53.05 g acetonitrile, and 13.26 g toluene was made by dissolving the solids in the solvents in a glass jar. A solution of 10 g PEO600K, 3.26 g LiTFSI, 85.49 g acetonitrile, and 23.87 g toluene was made similarly.

A mixture of 9.3 g alumina, 137.72 g PEG8K/LiTFSI solution, 43.49 g PEO600K/LiTFSI solution, 44.62 g acetonitrile, and 11.15 g toluene was made by high speed blending using a Silverson-type blender (SL2 model, Silverson Machines LTD, England) for 15 minutes at the middle power setting corresponding to about 1500 rpm. Triisocyanate (3.52 g) was added to the mixture prior to coating (less than 24 hours prior) and 0.2 g dibutyltin dilaurate was added to the mixture just before coating.

A 24-micron smooth thin film was made with a Hirano knife edge coater by coating on a 25 micron polypropylene liner and drying in an oven at 65–80° C. DSC (differential scanning calorimetry) indicated a Tm of 41° C., Tc of 24.8° C., and a Tg of −34.6° C. The swell ratio was 1.76.

Conductivity was measured in a LiLi cell (see Table 1) prepared as follows. A sheet of electrolyte film (electrolyte coated on a polypropylene liner) was laminated onto a sheet of lithium at 80° C. Two circular disks 1 ⅛-inch (2.9 cm) in diameter were punched out. These two disks were laminated together with a hollow polypropylene mask to prevent shorting between at 80° C. to form a cell. This cell was sealed between two copper shims with a hot melt adhesive for testing.

Example 2

Solid Polymer Electrolyte Composition

Example 1 was repeated with a different salt concentration. A solution of 75 g PEG8K, 16.31 g LiTFSI, 48.70 g acetonitrile, and 12.17 g toluene was made by dissolving the solids in the solvents in a glass jar. A solution of 10 g PE0600K, 2.17 g LiTFSI, 87.66 g acetonitrile, and 21.91 g toluene was made similarly. A solution of 60 g triisocyanate, 432 g acetonitrile, and 108 g toluene was also made in a glass jar.

A mixture of 9.3 g alumina, 136.79 g PEG8K/LiTFSI solution, 43.20 g PEO600K/LiTFSI solution, 18.1 g acetonitrile, and 4.52 g toluene was made by high speed blending using a Silverson-type blender (SL2 model, Silverson Machines LTD, England) for 15 minutes at the middle power setting corresponding to about 1500 rpm. Triisocyanate solution (37.54 g) was added to the mixture prior to coating (less than 24 hours prior) and 0.2 g dibutyltin dilaurate was added to the mixture just before coating.

A 24-micron smooth thin film was made with a Hirano coater as described in Example 1. DSC (differential scanning calorimetry) indicated a Tm of 46.5° C., Tc of 25.6° C. and a Tg of −34.6° C. The swell ratio was 1.76. Conductivity was 0.2 mS/cm at 60° C., which was measured in a LiLi cell as prepared in Example 1. LiLi cycling was performed at 60° C. (see FIG. 2) using Cycling Procedure No. 1.

Example 3 (Comparative)

Solid Polymer Electrolyte Composition

This example was done with no nanoparticles. PEG8K and PEO600K were dried at 50° C. under vacuum for 48 hours. A solution of 74.92 g PEG8K, 3.94 g PEO600K, 17.15 g LiTFSI, 0.39 g antioxidant, 94.27 g acetonitrile, and 23.57 g toluene was made by dissolving the solids in the solvents in a glass jar. A mixture of 14.88 g acetonitrile, 3.72 g toluene, and 16.96 g triisocyanate solution (20% solid in 4:1 acetonitrile Itoluene) was added to the solution before coating (less than 24 hours) and 0.2 g dibutyltin dilaurate catalyst was added just prior to coating.

Figure 2:
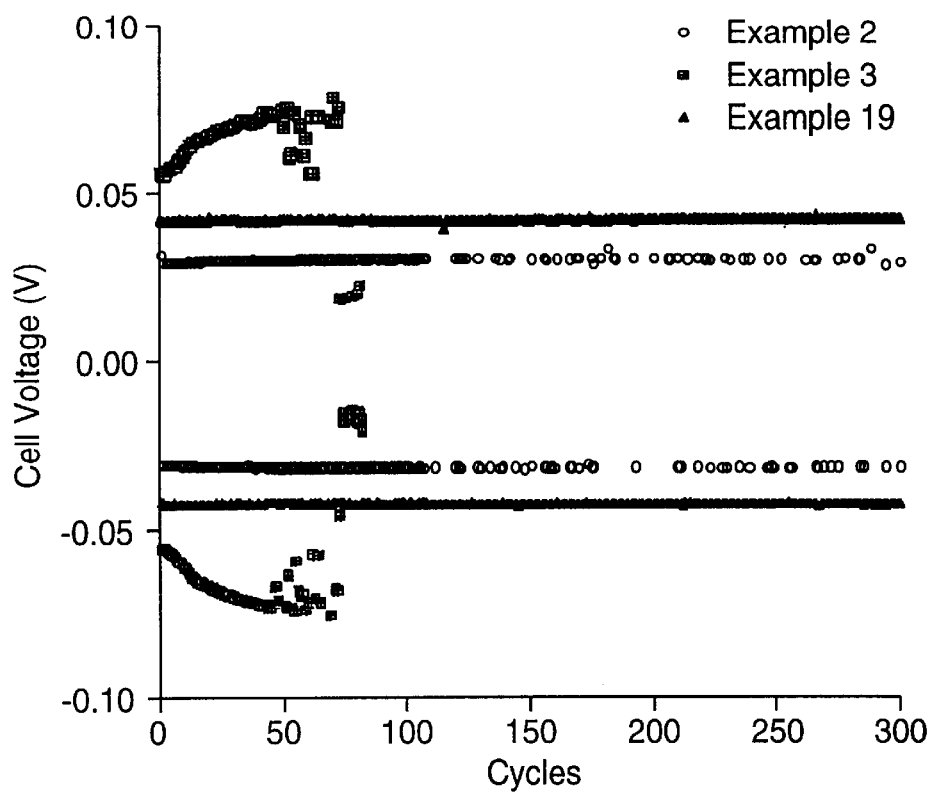
FIG. 2 is a graph of LiLi cycling performed at 60° C. using Cycling Procedure No. 1 for Examples 2, 3, and 19.
Figure 3:
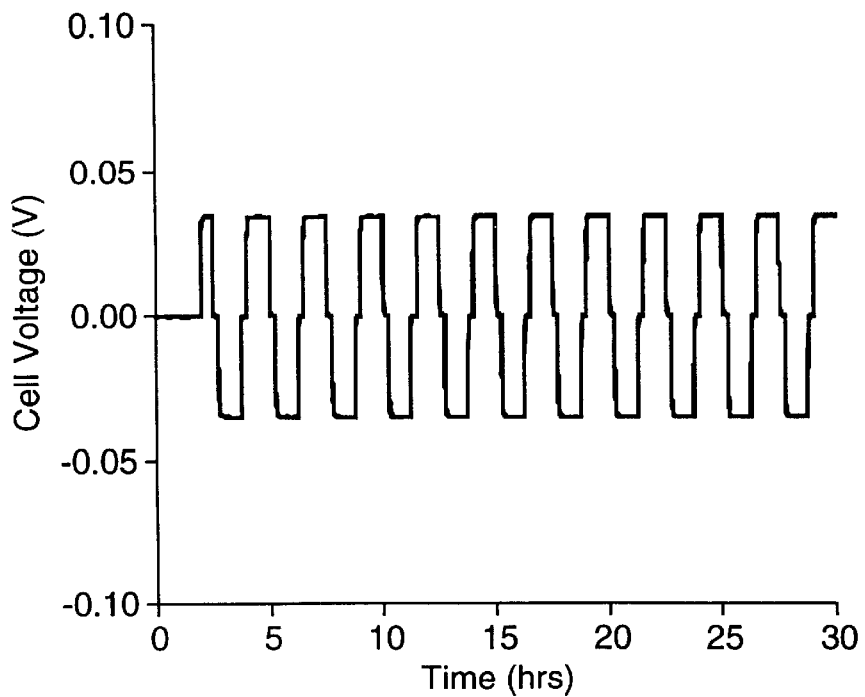
FIG. 3. is a graph of an enlarged portion of FIG. 2 for Example 2.

A 24-micron smooth thin film was made with a Hirano coater as described in Example 1. LiLi cells were made with the electrolyte for electrochemical characterization following the procedure in Example 1 and evaluated using Cycling Procedure No. 1. LiLi cycling was performed at 60° C. Conductivity and interfacial resistance was measured in a LiLi cell (see Table 2). FIG. 2 compares the cycling results of this example with no nanoparticles with that of Example 2 containing 10% alumina. The voltage curve with the nanoparticles is much improved over that with no nanoparticles.

Example 4

Solid Polymer Electrolyte Composition

Example 3 was repeated but with 3 wt-% alumina. A solution of 72.67 g PEG8K, 3.82 g PEO600K, 16.64 g LiTFSI, 0.38 g antioxidant, 91.43 g acetonitrile, and 22.86 g toluene was made by dissolving the solids in the solvents in a glass jar. A mixture of 2.79 g alumina, 207.08 g of the above solution, 17.37 g acetonitrile, and 4.34 g toluene was made by high speed blending using a Silverson-type blender (SL2 model, Silverson Machines LTD, England) for 15 minutes at the middle power setting corresponding to about 1500 rpm. Triisocyanate solution (17.50 g, 20% solid in 4:1 acetonitrile/toluene) was added to the solution before coating (less than 24 hours) and 0.2 g dibutyltin dilaurate catalyst was added just prior to coating.

A 24-micron smooth thin film was made with a Hirano coater as described in Example 1. LiLi cells were made with the electrolyte for electrochemical characterization following the procedure in Example 1. Conductivity and interfacial resistance were measured in a LiLi cell (see Table 2).

Example 5

Solid Polymer Electrolyte Composition

Example 3 was repeated but with 5 wt-% alumina. A solution of 71.17 g PEG8K, 3.75 g PEO600K, 16.29 g LiTFSI, 0.37 g antioxidant, 89.54 g acetonitrile, and 22.39 g toluene was made by dissolving the solids in the solvents in a glass jar. A mixture of 4.65 g alumina, 203.51 g of the above solution, 19.02 g acetonitrile, and 4.76 g toluene was made by high speed blending using a Silverson-type blender. Triisocyanate solution (17.87 g, 20% solid in 4:1 acetonitrile/toluene) was added to the solution before coating (less than 24 hours) and 0.2 g dibutyltin dilaurate was added just prior to coating.

A 24-micron smooth thin film was made with a Hirano coater as described in Example 1. LiLi cells were made with the electrolyte for electrochemical characterization following the procedure in Example 1. Conductivity and interfacial resistance was measured in a LiLi cell (see Tables 1 and 2).

Example 6

Solid Polymer Electrolyte Composition

Example 3 was repeated but with 7 wt-% alumina. A solution of 69.66 g PEG8K, 3.67 g PEO600K, 15.95 g LiTFSI, 0.37 g antioxidant, 87.65 g acetonitrile, and 21.91 g toluene was made by dissolving the solids in the solvents in a glass jar. A mixture of 6.51 g alumina, 199.21 g of the above solution, 20.68 g acetonitrile, and 5.17 g toluene was made by high speed blending using a Silverson-type blender (SL2 model, Silverson Machines LTD, England) for 15 minutes at the middle power setting corresponding to about 1500 rpm. Triisocyanate solution (18.23 g, 20% solid in 4:1 acetonitrile/toluene) was added to the solution before coating (less than 24 hours) and 0.2 g dibutyltin dilaurate was added just prior to coating.

A 24-micron smooth thin film was made with a Hirano coater as described in Example 1. LiLi cells were made with the electrolyte for electrochemical characterization following the procedure in Example 1. Conductivity and interfacial resistance was measured in a LiLi cell (see Table 2).

Example 7

Solid Polymer Electrolyte Composition

Example 3 was repeated but with 10 wt-% alumina. A solution of 67.41 g PEG8K, 3.55 g PEO600K, 15.43 g LiTFSI, 0.35 g antioxidant, 84.82 g acetonitrile, and 21.20 g toluene was made by dissolving the solids in the solvents in a glass jar. A mixture of 9.30 g alumina, 192.77 g of the above solution, 23.17 g acetonitrile, and 5.79 g toluene was made by high speed blending using a Silverson-type blender (SL2 model, Silverson Machines LTD, England) for 15 minutes at the middle power setting corresponding to about 1500 rpm. Triisocyanate solution (18.77 g, 20% solid in 4:1 acetonitrile/toluene) was added to the solution before coating (less than 24 hours) and 0.2 g dibutyltin dilaurate was added just prior to coating.

A 24-micron smooth thin film was made with a Hirano coater as described in Example 1. LiLi cells were made with the electrolyte for electrochemical characterization following the procedure in Example 1. Conductivity and interfacial resistance was measured in a LiLi cell (see Table 2).

Example 8

Solid Polymer Electrolyte Composition

Example 3 was repeated but with 12 wt-% alumina. A solution of 65.91 g PEG8K, 3.47 g PEO600K, 15.09 g LiTFSI, 0.35 g antioxidant, 82.93 g acetonitrile, and 20.73 g toluene was made by dissolving the solids in the solvents in a glass jar. A mixture of 11.16 g alumina, 188.48 g of the above solution, 24.83 g acetonitrile, and 6.21 g toluene was made by high speed blending using a Silverson-type blender (SL2 model, Silverson Machines LTD, England) for 15 minutes at the middle power setting corresponding to about 1500 rpm. Triisocyanate solution (19.13 g, 20% solid in 4:1 acetonitrile/toluene) was added to the solution before coating (less than 24 hours) and 0.2 g dibutyltin dilaurate was added just prior to coating.

A 24-micron smooth thin film was made with a Hirano coater as described in Example 1. LiLi cells were made with the electrolyte for electrochemical characterization following the procedure in Example 1. Conductivity and interfacial resistance was measured in a LiLi cell (see Table 2).

Example 9

Solid Polymer Electrolyte Composition

Example 3 was repeated but with 15 wt-% alumina. A solution of 63.66 g PEG8K, 3.35 g PEO600K, 14.57 g LiTFSI, 0.34 g antioxidant, 80.10 g acetonitrile, and 20.02 g toluene was made by dissolving the solids in the solvents in a glass jar. A mixture of 13.95 g alumina, 182.04 g of the above solution, 27.31 g acetonitrile, and 6.83 g toluene was made by high speed blending using a Silverson-type blender (SL2 model, Silverson Machines LTD, England) for 15 minutes at the middle power setting corresponding to about 1500 rpm. Triisocyanate solution (19.67 g, 20% solid in 4:1 acetonitrile/toluene) was added to the solution before coating (less than 24 hours) and 0.2 g dibutyltin dilaurate was added just prior to coating.

A 24-micron smooth thin film was made with a Hirano coater as described in Example 1. LiLi cells were made with the electrolyte for electrochemical characterization following the procedure in Example 1. Conductivity and interfacial resistance was measured in a LiLi cell (see Table 2).

Example 10 (Comparative)

Solid Polymer Electrolyte Composition

Example 3 was repeated but with higher molecular weight PEO to attempt to compensate for no nanoparticles. A solution of 58.08 g PEO200K, 3.06 g PEO600K, 13.30 g LiTFSI, 0.31 g antioxidant, 139.52 g acetonitrile, and 34.88 g toluene was made by dissolving the solids in the solvents in a glass jar. An aliquot of the above solution (249.14 g), 40.14 g acetonitrile, and 10.03 g toluene were combined in a glass jar. Triisocyanate solution (0.53 g, 20% solid in 4:1 acetonitrile/toluene) was added to the solution before coating (less than 24 hours) and 0.15 g dibutyltin dilaurate was added just prior to coating.

A 24-micron smooth thin film was made with a Hirano coater as described in Example 1. The film dissolved in water, meaning the crosslinked network by triisocyanate with the OH-end groups on the PEO was not sufficient.

Example 11

Solid Polymer Electrolyte Composition

Example 10 was repeated but with 10 wt-% alumina and PEO dried as in previous examples. A solution of 52.26 g PEO200K, 2.75 g PEO600K, 11.96 g LiTFSI, 0.28 g antioxidant, 125.54 g acetonitrile, and 31.39 g toluene was made by dissolving the solids in the solvents in a glass jar. A mixture of 6.97 g alumina, 224.18 g of the above solution, 52.47 g acetonitrile, and 13.12 g toluene was made by high speed blending using a Silverson-type blender (SL2 model, Silverson Machines LTD, England) for 15 minutes at the middle power setting corresponding to about 1500 rpm. Triisocyanate solution (3.11 g, 20% solid in 4:1 acetonitrile/toluene) was added to the solution before coating (less than 24 hours) and 0.15 g dibutyltin dilaurate was added just prior to coating.

A 24-micron smooth thin film was made with a Hirano coater as described in Example 1. The film had a swell ratio of 2.18 when soaked with water.

Example 12

Cathode and Cells with Solid Polymer Electrolyte Composition

A composite cathode was made and lab cells were assembled using this composite cathode and the solid polymer electrolyte of Example 2. The composite cathode was made as follows.

$Li_{1.2}V_3O_8$ powder and Ketjen Black were dried at 150° C. under vacuum for 24 hours. PEG8K and PEO600K were dried as in previous examples. A solution of 46.87 g PEG8K, 2.47 g PEO600K, 10.73 g LiTFSI, 0.25 g antioxidant, 72.37 g acetonitrile, and 18.09 g toluene was made by dissolving the solids in the solvents in a glass jar. A dispersion of 108.89 g $Li_{1.2}V_3O_8$, 3.37 g Ketjen Black, 150.78 g of the PEG8K/PEO600K/LiTFSI/antioxidant solution above, 180.83 g acetonitrile, and 45.21 g toluene was made by ball milling in a 1 liter baffled NALGENE milling jar with 1800 grams of 6 mm Yttrium (George Missbach and Co., Atlanta, Ga.) ceramic media at 100 rpm for 24 hours. Triisocyanate solution (10.61 g, 20% solid in 4:1 acetonitrile/toluene) was added to the solution about 1 hour before coating and 0.31 g tertiary amine was added just prior to coating.

A cathode (85 g/m$^2$ coating weight of composite cathode) using a carbon coated current collector (Rexam Current Collector) was made with a Hirano coater as in Example 1 but at 65–140° C. The cathode did not dissolve in acetonitrile, but came off the current collector as a film.

Lab cells consisting of the cathode, 15-micron electrolyte with composition as in Example 2 as separator, and lithium as anode were made for testing as described below. The cells were tested using Cycling Procedure No. 2 at 60° C. See Table 3 for cell performance results.

A sheet of electrolyte film (electrolyte coated on a polypropylene liner was laminated onto a sheet of lithium at 80° C. A circular disk 1 1/8-inch (2.9 cm) in diameter was punched out. A second circular disk 1 1/16-inch (2.7 cm) diameter of the cathode/Rexam current collector described above was punched out. The cathode/Rexam current collector disk was laminated onto the Li/Electrolyte disk with a hollow polypropylene mask between at 80° C. to form a cell. This cell was sealed between two copper shims with a hot melt adhesive for testing.

Example 13

Cathode and Cells with Solid Polymer Electrolyte Composition

Example 12 was repeated but with 10 wt-% alumina in the cathode. A solution of 42.16 g PEG8K, 2.22 g PEO600K, 9.65 g LiTFSI, 0.22 g antioxidant, 65.10 g acetonitrile, and 16.27 g toluene was made by dissolving the solids in the solvents in a glass jar. A dispersion of 108.89 g $Li_{1.2}V_3O_8$, 3.37 g Ketjen Black, 5.83 g alumina, 135.62 g of the PEG8K/PEO600K/LiTFSI/antioxidant solution above, 187.38 g acetonitrile, and 46.85 g toluene was made by ball milling. Triisocyanate solution (11.75 g, 20% solid in 4:1 acetonitrile/toluene) was added to the solution about 1 hour before coating and 0.31 g tertiary amine was added just prior to coating.

A cathode (85 g/m$^2$) using a carbon coated current collector was made with a Hirano coater as described in Example 12. The cathode did not dissolve in acetonitrile, but came off the current collector as a film.

Lab cells consisting of the cathode, 15-micron electrolyte with composition as in Example 2 as separator, and lithium as anode were made for testing as described in Example 12. The cells were tested using Cycling Procedure No. 2 at 60° C. See Table 3 for cell performance results.

Example 14

Gel Electrolyte Composition

A liquid EO-PO-EO block copolymer was used with PEGDME to make a gel electrolyte. Alumina was dried at 110° C. under vacuum for 24 hours. A sample of the alumina (4.23 g) was blended with a solution of 26.67 g liquid EO-PO-EO, 50 g PEGDME, 15 g LiTFSI, and 0.1 g surfactant using a Silverson-type blender (SL2 model, Silverson Machines LTD, England) for 15 minutes at the middle power setting corresponding to about 1500 rpm. Triisocyanate (4.10 g) was added to the solution 1 hour before coating and 0.20 g dibutyltin dilaurate was added to the mixture just before coating.

A 16-micron thin film was obtained by handspreading the mixture onto a thin sheet of lithium. The coating was cured at 80° C. for 5 minutes. A strong, elastic thin film was obtained. Conductivity of the film was measured in LiLi cells (see Table 4).

Example 15

Gel Electrolyte Composition

Example 14 was repeated but the final mixture was poured into a vial and cured at 80° C. for 5 minutes rather than coating. The cured sample was hard but elastic and showed no leakage of the PEGDME upon pressing.

Example 16

Gel Electrolyte Composition

Example 14 was repeated except a 24-micron thin film was made with a Hirano coater as described in Example 12. A strong, elastic thin film was obtained. The film did not swell when immersed in water and did not dissolve when immersed in acetonitrile.

Example 17

Cathode with Gel Electrolyte Composition

A gel cathode was prepared using PEGDME and liquid EO-PO-EO. $Li_{1.2}V_3O_8$ and Ketjen Black were dried at 150° C. under vacuum for 24 hours. A mixture of 124.46 g $Li_{1.2}V_3O_8$, 3.85 g Ketjen Back, 20.09 g liquid EO-PO-EO, 37.66 g PEGDME, 11.30 g LiTFSI, and 289.97 g ethyl acetate were milled in a high density polyethylene bottle with ceramic media (6-mm Y, obtained from George E. Missbach and Co., Atlanta, Ga.) Triisocyanate solution (12.54 g, 20% solid in ethyl acetate) was added to the solution 1 hour before coating and 0.14 g dibutyltin dilaurate was added to the mixture just before coating.

A cathode (15 g/m$^2$) using a carbon coated current collector was made with a Hirano coater as described in Example 12. The cathode did not dissolve in acetonitrile.

Example 18

Solid Polymer Electrolyte Composition

An experiment was done to see if the polymer could be cured without catalyst in order to begin an extrusion study. PEG8K and PEO600K were dried at 50° C. under vacuum for 48 hours. To one glass jar was added 79.19 g PEG8K and to another jar was added 79.19 g PEG8K and 17.22 g LiTFSI. Both were placed in an 80° C. oven in a dry room. The jar with LiTFSI melted after 2 hours. The PEO alone took longer. Both solutions are viscous liquids at 80° C. Triisocyanate (3.7 g) was added to each solution. The PEG solution solidified within 15 minutes. The PEG/LiTFSI solution remained a viscous liquid after 30 minutes; however after 1 hour at 80° C. it exhibited some gel formation but still flowed in the jar. After 2 hours, the PEG/LiTFSI/ isocyanate solution solidified completely.

Example 19

Solid Polymer Electrolyte Composition

An experiment was done similar to Example 7 but with a solid EO-PO-EO polymer replacing the PEG8K.

Alumina powder was dried at 110° C. under vacuum for 24 hours. A solid EO-PO-EO polymer was dried at 45° C. under vacuum for 48 hours and PEO600K was dried at 50° C. under vacuum for 48 hours. A solution of 104.90 g solid EO-PO-EO polymer, 5.52 g PEO600K, 19.45g LiTFSI, 0.55 g antioxidant, 104.30 g acetonitrile, and 26.09 g toluene was made by dissolving the solids in the solvents in a glass jar. To this was added 13.95 g alumina, 5.10 g acetonitrile, and 1.28 g toluene and the mixture was blended with a Silverson-type blender (SL2 model, Silverson Machines LTD, England) for 15 minutes at the middle power setting corresponding to about 1500 rpm. Triisocyanate solution (18.59 g, 30% solid in 4:1 acetonitrile/toluene) was added to the mixture prior to coating (less than 24 hours prior) and 0.23 g dibutyltin dilaurate solution (20% solid in toluene) was added to the mixture just before coating.

An 18-micron smooth thin film was made with a Hirano coater as in Example 1. LiLi cells were made with the electrolyte for electrochemical characterization following the procedure in Example 1 and evaluated using Cycling Procedure No. 1 was performed at 60° C. (see FIG. 2 and Table 1).

Example 20–23

Example 2 was repeated but with 3 wt-% (Example 20), 5 wt-% (Example 21), and 10 wt-% (Example 22) 7 nm hydrophobic fumed silica replacing the 10 wt-% alumina. The coating was "sandy" and not as smooth as the film in Example 2. No electrochemical testing was done and no further work to optimize the solvent or blending method was done, but it is believed this composition could be modified to form a smoother film.

Example 24–26

Example 2 was repeated but with 3 wt-% (Example 24), 5 wt-% (Example 25), and 10 wt-% (Example 26) 15 nm hydrophobic fumed silica replacing the 10 wt-% alumina. The coating was "sandy" and not as smooth as the film in Example 2. No electrochemical testing was done and no further work to optimize the solvent or blending method was done, but it is believed this composition could be modified to form a smoother film.

Example 27

Solid Polymer Electrolyte Composition

This is an example using a random EO-PO copolymer as the precursor. Alumina powder was dried at 110° C. under vacuum for 24 hours. The random EO-PO copolymer was used as received. A solution of 149.88 g random EO-PO copolymer, 24.45 g LiTFSI, 0.75 g antioxidant, 60.03 g acetonitrile, and 15.01 g toluene was made by dissolving the polymer, LiTFSI, and antioxidant in the solvents in a glass jar. To this was added, 18.60 g alumina, 16.13 g acetonitrile, and 4.03 g toluene and the mixture was blended with a Silverson-type blender (SL2 model, Silverson Machines LTD, England) for 15 minutes at the middle power setting corresponding to about 1500 rpm. Triisocyanate solution (14.81 g, 40% solid in 4:1 acetonitrile:toluene) was added to the mixture prior to coating (less than 24 hours) and 4.0 g dibutyltin dilaurate solution (40% solid in toluene) was added to the mixture just before coating.

A 19-micron thin film was made with a Hirano coater as described in Example 1. Conductivity was measured in LiLi cells (see Table 1). Differential scanning calorimetry was run on the crosslinked solid polymer from 200° C. to −120° C. and no crystallization was observed above the Tg of −60° C., indicating an amorphous polymer.

Example 28

This example results in the formation of urea and urethane linkages. JEFFAMINE D-2000 is used with PEGDME to make a gel electrolyte. Alumina powder is dried at 110° C. under vacuum for 24 hours and 9.3 g of the alumina is blended with a liquid solution of 20.97 g JEFFAMINE D-2000, 50 g PEGDME, 15 g LiTFSI, and 0.1 g coating additive (surfactant such as ZONYL FSN, DuPont, Wilmington, Del.) using a Silverson-type blender (SL2 model, Silverson Machines LTD, England) for 15 minutes at the middle power setting corresponding to about 1500 rpm. Triisocyanate (4.43 g) triisocyanate is added to the solution 1 hour before coating and 0.20 g catalyst is added to the mixture just before coating. A thin film of gel electrolyte is obtained by hand-spreading the mixture onto a polypropylene liner. The coating is cured at 80° C. for 5 minutes.

Example 29

This example results in the formation of thiocarbamate linkages. Alumina powder is dried at 110° C. under vacuum for 24 hours. The random EO-PO copolymer is used as received and 1404 grams of it is melted and brought to 80° C. P2S5 (13.5 g) is slowly added with good agitation. The mixture is agitated for 2 hours until the exotherm is complete and the temperature drops to 80° C. The dithiophosphoric acid derivative thus obtained is heated to 100° C., 17 grams NaSH is added with a few drops of antifoam, and the mixture is heated 2 hours at 200° C. and then 16 hours at 170° C. and allowed to cool to room temperature. Cold water (200 g) is added slowly and then 300 g 35% HCl is added dropwise. The mixture is extracted with toluene and the solvent vacuum removed to yield the dithiol polymer. A solution of 149.88 g of this dithiol polymer is then converted to the thiocarbamate according to the procedure of Example 27 substituting the dithiol polymer for the random EO-PO copolymer.

Example 30

Synthesis of Polymer from PEO100K/17X IEM

This example represents a 17-fold molar excess of IEM based on the amount of PEO100K used. The following were dissolved in 2000 g toluene in a gallon glass jar equipped with an air driven mixer and immersed in a water bath at 70–80° C.: 0.88 g BHT, 0.88 g PBX-1, 1.77 g dibutyltin dilaurate, and 850 g of PEO100K. After all the PEO had dissolved, 34 g of IEM was added in a stream with vigorous stirring. Gentle mixing was continued until all the IEM had reacted, as evidenced by the disappearance of the NCO peak in FTIR at 2270 cm$^{-1}$. The reaction took about 6 hours at 70° C. for completion. The total weight of the solution was 2310 g, due to loss of some toluene. A total of 475 g of acetonitrile was added with good mixing to bring the final solvent composition to 75/25 toluene/acetonitrile. The non-volatile content was measured as 31.4%. The amber colored clear solution was free of crosslinked particles and stable for over 6 weeks.

This solution was made into an electrolyte composition as described in Electrolyte Coating Procedure. Cure as indicated by NMR was greater than 90%. Li/Li cells were made as described in Example 1. The conductivity of the electrolyte was measured by AC impedance of Li/Li cells, to be 0.0012 mS/cm at room temperature and 0.3 mS/cm at 80° C.

Example 31

Synthesis of Polymer from PEO200K/25X IEM

This example represents a 25-fold molar excess of IEM based on the amount of PEO200K used. The procedure described in Example 30 was employed but using the following amounts: toluene, 2000 g; BHT, 0.52 g; PBX-1, 0.52 g; dibutyltinlaurate, 1.04 g; PEO200K, 500 g; IEM, 20 g. After completion of the reaction, which took about 7 hours at 70° C., 500 g acetonitrile was added to 2225 g of solution to bring the final solvent composition to 75/25 toluene/acetonitrile, 18.6% solids. Electrolyte was produced as in the Electrolyte Coating Procedure. Cure as indicated by NMR was greater than 85%. The swell ratio was greater than 1.2. Li/Li cells were made as described in Example 1 and tested as in Cycling Procedure No. 1 at 80° C. The conductivity of the electrolyte was measured by AC impedance of Li/Li cells, to be 1.4×10$^{-6}$ S/cm at room temp and 3.0×10$^{-4}$ S/cm at 80° C. The cells cycled about 150 cycles before failure.

Example 32

Synthesis of Polymer from PEO400K/40X IEM

This example represents a 40-fold molar excess of IEM based on the amount of PEO400K used. The procedure described in Example 30 was employed but using the following amounts: toluene, 2400 g; BHT, 0.16 g; dibutyltinlaurate, 0.35 g; PEO400K, 160 g; and IEM, 5 g. After complete reaction (14 hours at 70° C.), 483 g acetonitrile was added to 2108 g of the solution. The final solids content was 6.1%. This solution was made into electrolyte as described in the Electrolyte Coating Procedure. Due to the poor quality of the coating, most likely due to drying problems associated with the high molecular (400,000) PEO, cells were not assembled. Conductivity, cure and cycling were not done.

Example 33

Synthesis of Polymer from PEO200K/25X IEM

This example, along with Examples 34–36, represent different levels of IEM and show the improvement with increasing levels of IEM. This example represents a 25X molar excess of IEM. The procedure described in Example 31 was employed but the electrolyte was made using 62 g of the uncrosslinked reaction product, 0.36 g KT046, 4.68 g LiTFSI, and 53 g acetonitrile. After coating and crosslinking a Li/Li cell was assembled as described in Example 1 and tested as in Cycling Procedure No. 1 at 80° C. The swell ratio was 1.91. The conductivity of the electrolyte was measured by AC impedance of Li/Li cells, to be 0.3–0.4 mS/cm at 80° C. The cells cycled 44 cycles at 80° C. (average of 3 cells) before failure.

Example 34

Synthesis of Polymer from PEO200K/50X IEM

This example represents a 50X molar excess of IEM. The procedure described in Example 33 was employed but the electrolyte was made using 59.6 g of the uncrosslinked reaction product, 55 g acetonitrile, and adding 0.51 g of a product of a IEM/water reaction. This IEM/water reaction was carried out separately and prior to it's addition to the uncrosslinked reaction product by adding 20 g IEM to excess water (200 g), filtering, washing with heptane, and drying under a vacuum. After coating and crosslinking a Li/Li cell was assembled as described in Example 1 and tested as in Cycling Procedure No. 1 at 80° C. The swell ratio was 1.75, conductivity was 0.3–0.4 mS/cm at 80° C. Li/Li cycles were 50 (average of 3 cells) at 80° C.

Example 35

Synthesis of Polymer from PEO200K/75X IEM

This example represents a 75-fold molar excess of IEM. The procedure described in Example 5 was employed but the electrolyte was made using 57.06 g of the uncrosslinked reaction product, 57 g acetonitrile, and adding 0.1.04 g of the product of an IEM/water reaction as in Example 34. After coating and crosslinking a Li/Li cell was assembled as described in Example 1 and tested as in Cycling Procedure No. 1 at 80° C. The swell ratio was 1.57, conductivity was 0.3–0.4 mS/cm at 80° C., Li/Li cycles were 70 (average of 3 cells) at 80° C.

Example 36 (Comparative)

Synthesis of Polymer from PEO200K/IEM

This example represents no molar excess of IEM. The procedure described in Example 31 was employed but 700 g of the uncrosslinked polymer solution was added to 1400 g of isopropanol to crystallize the solid. This solid was redissolved in 600 g acetonitrile and added to another 200 g isopropanol to again recrystallize the solid. This was repeated for a total of 4 times to remove essentially all the non-PEO containing adduct. The recrystallized solid (11.94 g) was dissolved in 50 g of acetonitrile and mixed with 0.33 g KT046, 4.31 g LiTFSI, and 44 g acetonitrile. After coating and crosslinking a Li/Li cell was assembled as described in Example 1 and tested as in Cycling Procedure No. 1 at 80° C. The swell ratio was 2.17, conductivity was 0.3–04 mS/cm at 80° C., Li/Li Cycles were 30 (average of 3 cells) at 80° C.

Example 37 (Comparative)

Synthesis using PEG400

This example represents a synthesis with too low of a molecular weight. The procedure described in Example 30 was employed but using the following amounts: MEK, 200 g (substituted for toluene to dissolve the PEO); BHT, 0.20 g; dibutyltinlaurate, 1.0 g; PEG400, 200 g; IEM, 100 g. After 3 hours at 70° C. the reaction was complete. However, after further crosslinking as detailed in the Electrolyte Coating Procedure the coating was powdery and had no film integrity.

Example 38 (Comparative)

PEO200K/25X IEM/No Crosslinking

This example demonstrates the importance of crosslinking. The procedure described in Example 31 was employed except that the subsequent crosslinker was not done as detailed in the Electrolyte Coating Procedure. A Li/Li cell was assembled as described in Example 1 and tested as in Cycling Procedure No. 1 at 80° C. The cell failed after less than 15 cycles.

Electrolyte Coating Procedure

The electrolyte solution was prepared in a dry room by adding a solution of 12.6 g of LiTFSI and 1.0 g of KT046 in 12 g acetonitrile to 150 g of the solution described in the examples. The solution was doctor-coated to get 19 grams per square meter (gsm) (15 microns) coating weight on polypropylene film. The dry coating was UV cured at 3 meters/minute and UV lamp power setting of 360 Watts/inch (142 Watts/cm), to obtain the electrolyte coating. Swell ratio was used as an indication of cure.

Cycling Procedure No. 1

Step 1: Cells were rested for 2 hours in designated oven before cycling.

Step 2: Cycling began with charging with a current of 0.26 mA/cm$^2$ for 30 minutes (min), followed by a 15-minute rest.

Step 3: Cells were discharged with a current of 0.26 mA/cm$^2$ for 1 hour, followed by a 15-minute rest.

Step 4: Cells were charged with a current of 0.26 mA/cm$^2$ for 1 hour, followed by a 15-minute rest.

Cycling was repeated from Step 3.

Cycling Procedure No. 2

Sep1: Cells were rested for 2 hours in designated oven before cycling.

Step 2: Cycling began with C/8-discharge to 10% DOD (depth of discharge), followed by a 30-second (sec) rest.

Step 3: Cells were discharged with C/8-rate to 50% DOD (depth of discharge), followed by a 30-second rest.

Step 4: Cells were discharged with C/8-rate to 90% DOD (depth of discharge), followed by a 30-second rest.

Step 5: Cells were discharged with C/8-rate to 100% DOD (depth of discharge).

Step 6: Cells were charged with C/8-rate followed by a 1-hour float.

Cycling was repeated from Step 2 for 3 cycles, followed by 1-week float at the end of charge.

Cycling was then repeated from Step 2 for as many cycles as desired.

Swell Test Procedure

This procedure measures the degree of crosslinking in electrolyte by means of two-dimensional linear swell. Equipment included a cutting board, mallet, round specimen cutting die (51 millimeter (mm) diameter), round circular knob (specimen holder), 150-cm scaled Pyrex glass evaporating dish, and a temperature gauge. A polyethylene plastic liner was removed from a coated sample and the polypropylene coated backing was placed on the cutting board with the electrolyte coated side facing up. Using the die and mallet a 51-mm circular specimen was obtained. The coated side of the backing was placed down and centered on to the top of the glass evaporating dish. A water faucet was turned on to maintain a constant temperature of 20° C. +/−2° C. with constant flow while the glass evaporating dish was wetted completely. While holding the specimen, the round circular knob was set gently on top to hold in place while the coating swelled away from the backing. The knob was gently rotated and the knob and glass kept well wetted under the faucet. When the backing separated from the electrolyte, all wrinkles were removed and the swell diameter was recorded in millimeters. The procedure was repeated for an appropriate number of specimens per sample. Swell ratio= diameter of swollen sample/original sample diameter. This data is shown in Table 5.

TABLE 1

Conductivity versus Temperature

| Temp. | Example 1 Conductivity (S/cm) | Example 5 Conductivity (S/cm) | Example 19 Conductivity (S/cm) | Example 27 Conductivity (S/cm) |
|---|---|---|---|---|
| 40° C. | $7.7 \times 10^{-5}$ | $4.2 \times 10^{-5}$ | $7.79 \times 10^{-5}$ | $8.96 \times 10^{-5}$ |
| 50° C. | $1.9 \times 10^{-4}$ | $1.6 \times 10^{-4}$ | $1.32 \times 10^{-4}$ | $1.41 \times 10^{-4}$ |
| 60° C. | $2.9 \times 10^{-4}$ | $2.3 \times 10^{-4}$ | $2.00 \times 10^{-4}$ | $2.04 \times 10^{-4}$ |
| 70° C. | $4.0 \times 10^{-4}$ | $3.2 \times 10^{-4}$ | $2.72 \times 10^{-4}$ | $2.70 \times 10^{-4}$ |
| 80° C. | $5.2 \times 10^{-4}$ | $4.3 \times 10^{-4}$ | $3.54 \times 10^{-4}$ | $3.52 \times 10^{-4}$ |

TABLE 2

Conductivity and Interfacial Resistance at 60° C.

| % Alumina/Isocyanate) | Conductivity (S/cm) | Interface Resistance (ohm · cm$^2$) |
|---|---|---|
| 0 (Example 3) | $2.5 \times 10^{-4}$ | 46.2 |
| 3 (Example 4) | $2.4 \times 10^{-4}$ | 58.6 |
| 5 (Example 5) | $2.5 \times 10^{-4}$ | 32.3 |
| 7 (Example 6) | $2.5 \times 10^{-4}$ | 18.4 |
| 10 (Example 7) | $2.4 \times 10^{-4}$ | 17.7 |
| 12 (Example 8) | $2.3 \times 10^{-4}$ | 23.0 |
| 15 (Example 9) | $2.2 \times 10^{-4}$ | 16.8 |

TABLE 3

Cell Performance at 60° C.

| EXAMPLE | 10 msec ASI (ohm · cm$^2$) | 30 sec ASI (ohm · cm$^2$) | 1-hour float current (microA/cm$^2$) |
|---|---|---|---|
| 12 (no nanoparticles) | 33.09 +/− 2.56 | 105.72 +/− 11.50 | 2.37 +/− 1.00 |
| 13 (10% alumina) | 20.13 +/− 0.72 | 100.00 +/− 3.97 | 1.32 +/− 1.03 |

TABLE 4

Conductivity versus Temperature (Example 14)

| Temperature ° C. | Conductivity (S/cm) | Interfacial Resistance (ohm · cm$^2$) |
|---|---|---|
| 25 | $7.3 \times 10^{-4}$ | 254.7 |
| 40 | $8.6 \times 10^{-4}$ | 64.1 |
| 50 | $8.7 \times 10^{-4}$ | 26.0 |

TABLE 4-continued

Conductivity versus Temperature (Example 14)

| Temperature ° C. | Conductivity (S/cm) | Interfacial Resistance (ohm · cm$^2$) |
|---|---|---|
| 60 | $8.5 \times 10^{-4}$ | 12.4 |
| 70 | $8.6 \times 10^{-4}$ | 6.4 |
| 80 | $9.2 \times 10^{-4}$ | 4.6 |

TABLE 5

Swell Ratios

| EXAMPLE | SWELL RATIO |
|---|---|
| 1 | 1.76 |
| 2 | 1.76 |
| 19 | 1.66 |
| 27 | 1.75 |
| 31 | >1.2 |
| 33 | 1.91 |
| 34 | 1.75 |
| 35 | 1.57 |
| 36 | 2.17 |
| 14 | <1.2 |

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A solid polymer electrolyte composition comprising:
   a crosslinked solid ionically conductive polymer having urethane groups, urea groups, thiocarbamate groups, or combinations thereof;
   inorganic oxide particles; and
   a salt;
   wherein the crosslinked solid ionically conductive polymer is prepared from at least one polymer having a weight average molecular weight of no greater than about 300,000 and at least one polymer having a weight average molecular weight of at least about 300,000;
   with the proviso that at 20° C. there is less than about 1 wt-% liquid present in the electrolyte composition; and
   wherein the solid polymer electrolyte composition has an ionic conductivity of at least about $1 \times 10^{-4}$ S/cm at about 60° C.

2. The solid polymer electrolyte composition of claim 1 wherein the inorganic oxide particles are substantially covalently bonded to either the polymer or other inorganic oxide particles through urethane groups, urea groups, thiocarbamate groups, or combinations thereof.

3. The solid polymer electrolyte composition of claim 1 wherein the crosslinked solid ionically conductive polymer is prepared from a polymer of the formula A-(alkylene oxide)$_n$-A, wherein A is —OH, —NH$_2$, or —SH, and n is at least about 10, and a molar excess of a compound of the formula Z—R—T, wherein T is an organic group comprising a vinyl group, R is a divalent organic group, and Z is a functional group capable of reacting with —OH, —NH$_2$, or —SH.

4. The solid polymer electrolyte composition of claim 1 wherein the solid ionically conductive polymer comprises a poly(alkylene oxide) polymer having urethane groups.

5. The solid polymer electrolyte composition of claim 1 wherein the inorganic oxide particles have hydroxyl groups.

6. The solid polymer electrolyte composition of claim 1 wherein the inorganic oxide particles comprise alumina.

7. The solid polymer electrolyte composition of claim 1 wherein the solid ionically conductive polymer comprises a poly(alkylene oxide) polymer or a poly(alkylene imine) polymer having urethane groups, urea groups, thiocarbamate groups, or combinations thereof.

8. The solid polymer electrolyte composition of claim 1 wherein the solid polymer electrolyte composition has a swell ratio of less than about 2.

9. The solid polymer electrolyte composition of claim 8 wherein the swell ratio is about 1.6 to about 2.

10. A solid polymer electrolyte composition comprising:
   a crosslinked solid ionically conductive polymer having urethane groups, urea groups, thiocarbamate groups, or combinations thereof;
   nanoparticles, wherein at least 50% of the nanoparticles have a smallest dimension less than about 50 nm; and
   a salt;
   wherein the crosslinked solid ionically conductive polymer is prepared from at least one polymer having a weight average molecular weight of no greater than about 300,000 and at least one polymer having a weight average molecular weight of at least about 300,000;
   with the proviso that at 20° C. there is less than about 1 wt-% liquid present in the electrolyte composition; and
   wherein the solid polymer electrolyte composition has an ionic conductivity of at least about 1×10$^{-4}$ S/cm at 60° C.

11. The solid polymer electrolyte composition of claim 10 wherein the solid ionically conductive polymer comprises a poly(alkylene oxide) polymer or a poly(alkylene imine) polymer having urethane groups, urea groups, thiocarbamate groups, or combinations thereof.

12. The solid polymer electrolyte composition of claim 10 wherein the solid ionically conductive polymer is prepared from a polyisocyanate, a poly(alkylene oxide) polymer having an equivalent weight of about 1,000 to about 100,000 and a poly(alkylene oxide) polymer having an equivalent weight of about 150,000 to about 500,000.

13. The solid polymer electrolyte composition of claim 12 wherein the poly(alkylene oxide) polymer having an equivalent weight of about 1,000 to about 100,000 and the poly(alkylene oxide) polymer having an equivalent weight of about 150,000 to about 500,000 have hydroxyl functionality.

14. The solid polymer electrolyte composition of claim 10 wherein the solid polymer electrolyte composition has an interfacial resistance of about 10 ohms·cm$^2$ to about 100 ohms·cm$^2$.

15. The solid polymer electrolyte composition of claim 10 wherein the solid polymer electrolyte composition has a crystalline melting point of less than about 60° C., a crystallization temperature of less than about 40° C., and a glass transition temperature of about −30° C. to about −40° C.

16. The solid polymer electrolyte composition of claim 10 wherein the solid polymer electrolyte composition is amorphous at room temperature.

17. The solid polymer electrolyte composition of claim 10 wherein the crosslinked solid ionically conductive polymer is derived from a polymer of the formula A-(alkylene oxide)$_n$-A, wherein A is —OH, —NH$_2$, or —SH, and n is at least about 10, and a molar excess of a compound of the formula Z—R—T, wherein T is an organic group comprising a vinyl group, R is a divalent organic group, and Z is a functional group capable of reacting with —OH, —NH$_2$, or —SH.

18. The solid polymer electrolyte composition of claim 10 wherein the solid ionically conductive polymer comprises a poly(alkylene oxide) polymer having urethane groups.

19. A solid polymer electrolyte composition comprising:
   a crosslinked solid ionically conductive polymer comprising a poly(alkylene oxide) polymer having urethane groups;
   at least about 0.5 wt-% hydroxyl-functional inorganic oxide particles; and
   a salt;
   wherein the crosslinked solid ionically conductive polymer is prepared from at least one polymer having a weight average molecular weight of no greater than about 300,000 and at least one polymer having a weight average molecular weight of at least about 300,000;
   with the proviso that at 20° C. there is less than about 1 wt-% liquid present in the electrolyte composition; and
   wherein the solid polymer electrolyte composition has an ionic conductivity of at least about 1×10$^{-4}$ S/cm at about 60° C.

20. A solid polymer electrolyte composition comprising:
   a crosslinked solid ionically conductive polymer comprising a poly(alkylene oxide) polymer having urethane groups, wherein the solid ionically conductive polymer is prepared from a polyisocyanate, a poly(alkylene oxide) polymer having an equivalent weight of about 1,000 to about 100,000, and a poly(alkylene oxide) polymer having an equivalent weight of about 150,000 to about 500,000;
   at least about 3 wt-% hydroxy-functional inorganic oxide particles; and
   a lithium salt;
   with the proviso that at 20° C. there is less than about 1 wt-% liquid present in the electrolyte composition; and
   wherein the solid polymer electrolyte composition has an ionic conductivity of at least about 1×10$^{-4}$ S/cm at about 60° C.

21. A solid polymer electrolyte composition comprising:
   a crosslinked solid ionically conductive polymer prepared from a polymer of the formula A-(alkylene oxide)$_n$-A, wherein A is —OH, —NH$_2$, or —SH, and n is at least about 10, and a molar excess of a compound of the formula Z—R—T, wherein T is an organic group comprising a vinyl group, R is a divalent organic group, and Z is a functional group capable of reacting with —OH, —NH$_2$, or —SH;
   at least about 0.5 wt-% hydroxyl-functional inorganic oxide particles; and
   a lithium salt;
   wherein the crosslinked solid ionically conductive polymer is prepared from at least one polymer having a weight average molecular weight of no greater than about 300,000 and at least one polymer having a weight average molecular weight of at least about 300,000;
   with the proviso that at 20° C. there is less than about 1 wt-% liquid present in the electrolyte composition; and wherein the solid polymer electrolyte composition has an ionic conductivity of at least about $1 \times 10^{-4}$ S/cm at about 60° C.

22. A half cell comprising:

a cathode;

a current collector; and a solid polymer electrolyte composition of claim 1.

23. A half cell comprising:

a cathode;

a current collector; and a solid polymer electrolyte composition of claim 10.

24. A half cell comprising:

a cathode;

a current collector; and a solid polymer electrolyte composition of claim 19.

25. A half cell comprising:

a cathode;

a current collector; and a solid polymer electrolyte composition of claim 20.

26. A half cell comprising:

a cathode;

a current collector; and a solid polymer electrolyte composition of claim 21.

27. An electrochemical cell comprising:

a first electrode;

a second electrode; and a solid polymer electrolyte composition of claim 1.

28. An electrochemical cell comprising:

a first electrode;

a second electrode; and a solid polymer electrolyte composition of claim 10.

29. An electrochemical cell comprising:

a first electrode;

a second electrode; and a solid polymer electrolyte composition of claim 19.

30. An electrochemical cell comprising:

a first electrode;

a second electrode; and a solid polymer electrolyte composition of claim 20.

31. An electrochemical cell comprising:

a first electrode;

a second electrode; and a solid polymer electrolyte composition of claim 21.

32. An alkali polymer battery comprising a solid polymer electrolyte composition of claim 1.

33. An alkali polymer battery comprising a solid polymer electrolyte composition of claim 10.

34. An alkali polymer battery comprising a solid polymer electrolyte composition of claim 19.

35. An alkali polymer battery comprising a solid polymer electrolyte composition of claim 20.

36. An alkali polymer battery comprising a solid polymer electrolyte composition of claim 21.

* * * * *

UNITED STATES PATENT AND TRADEMARK OFFICE
CERTIFICATE OF CORRECTION

PATENT NO. : 6,673,273 B2
DATED : January 6, 2004
INVENTOR(S) : Le, Dinh Ba

It is certified that error appears in the above-identified patent and that said Letters Patent is hereby corrected as shown below:

Column 10,
Line 25, replace "cyanoto" with -- cyanato --;
Line 27, replace "perhydo" with -- perhydro --;
Line 37, replace "carbodimide" with -- carbodiimide --;

Column 11,
Line 32, replace "polyisocyates" with -- polyisocyanates --;
Line 40, replace "dioxtyltin" with -- dioxyltin --;

Column 15,
Line 37, replace "triflurosulfon" with -- trifluorosulfon --;
Line 46, replace "Polyethylenglycol" with -- Polyethyleneglycol --;
Line 65, replace "Gurnlee" with -- Gurnee --;

Column 16,
Line 11, replace "Pittsburg" with -- Pittsburgh --;
Line 54, insert the word -- them -- following the word "between";
Line 64, replace "PEØ" with -- PEO --;

Column 17,
Line 27, replace "acetonitrile Itoluene" with -- acetonitrile/toluene --;

Column 20,
Line 53, insert the word -- them -- following the word "between";

Column 22,
Lines 52 and 63, replace "Example" with -- Examples --;

Column 25,
Line 59, replace "04" with -- 0.4 --;

UNITED STATES PATENT AND TRADEMARK OFFICE
CERTIFICATE OF CORRECTION

PATENT NO. : 6,673,273 B2
DATED : January 6, 2004
INVENTOR(S) : Le, Dinh Ba

It is certified that error appears in the above-identified patent and that said Letters Patent is hereby corrected as shown below:

Column 26,
Line 43, replace "Sep1:" with -- Step 1: --;

Signed and Sealed this

Thirteenth Day of July, 2004

JON W. DUDAS
*Acting Director of the United States Patent and Trademark Office*